US012606711B2

(12) United States Patent
Kimata et al.

(10) Patent No.: US 12,606,711 B2
(45) Date of Patent: Apr. 21, 2026

(54) CONDUCTIVE STANNIC OXIDE PARTICLE-CONTAINING ORGANIC SOLVENT-DISPERSED SOL AND METHOD OF PRODUCTION THEREOF

(71) Applicant: NISSAN CHEMICAL CORPORATION, Tokyo (JP)

(72) Inventors: Masaki Kimata, Funabashi (JP); Yuki Watanabe, Funabashi (JP); Masato Yamaguchi, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/849,962

(22) PCT Filed: Mar. 26, 2024

(86) PCT No.: PCT/JP2024/011858
§ 371 (c)(1),
(2) Date: Sep. 23, 2024

(87) PCT Pub. No.: WO2024/209991
PCT Pub. Date: Oct. 10, 2024

(65) Prior Publication Data
US 2025/0109302 A1 Apr. 3, 2025

(30) Foreign Application Priority Data
Apr. 3, 2023 (JP) ................................ 2023-060241

(51) Int. Cl.
*C09D 5/00* (2006.01)
*C09D 5/03* (2006.01)
*C09D 7/20* (2018.01)
*C09D 7/62* (2018.01)
*C09D 7/80* (2018.01)

(52) U.S. Cl.
CPC ............... *C09D 5/031* (2013.01); *C09D 7/20* (2018.01); *C09D 7/62* (2018.01); *C09D 7/80* (2018.01)

(58) Field of Classification Search
None
See application file for complete search history.

(56) References Cited

U.S. PATENT DOCUMENTS 3,860,523 A 1/1975 Petrow et al.
4,589,997 A 5/1986 Watanabe et al.
5,460,738 A 10/1995 Watanabe et al.
5,891,362 A 4/1999 Watanabe et al.
6,177,131 B1 * 1/2001 Glaubitt ................ C03C 17/007 427/167
2001/0006932 A1 * 7/2001 Hesse ..................... C07C 68/01 558/274
2004/0086724 A1 5/2004 Suzuki et al.
2005/0209346 A1 9/2005 Koyama et al.
2006/0025518 A1 * 2/2006 Koyama .................. G02B 1/11 524/588
2006/0116429 A1 6/2006 Koyama et al.
2007/0297966 A1 12/2007 Fujimoto et al.
2011/0114871 A1 * 5/2011 Koyama ................ B82Y 30/00 252/75
2012/0316266 A1 12/2012 Koyama et al.
2022/0010176 A1 1/2022 Hida et al.

FOREIGN PATENT DOCUMENTS

| | | | |
|---|---|---|---|
| CN | 102781821 | A | 11/2012 |
| CN | 105457572 | A | 4/2016 |
| JP | 35-6616 | B1 | 6/1960 |
| JP | 50-40119 | B1 | 12/1975 |
| JP | 57-11848 | B2 | 3/1982 |
| JP | 59-232931 | A | 12/1984 |
| JP | 60-41536 | A | 3/1985 |
| JP | 61-227918 | A | 10/1986 |
| JP | 6-24746 | A | 2/1994 |
| JP | 9-80203 | A | 3/1997 |
| JP | 9-278445 | A | 10/1997 |
| JP | 10-251018 | A | 9/1998 |
| JP | 2001-123115 | A | 5/2001 |
| JP | 2004-149329 | A | 5/2004 |
| JP | 2005-296940 | A | 10/2005 |
| JP | 2006-176392 | A | 7/2006 |
| JP | 2008-50253 | A | 3/2008 |
| JP | 2013-252981 | A | 12/2013 |
| JP | 2015-189663 | A | 11/2015 |
| KR | 10-2011-0031240 | A | 3/2011 |

OTHER PUBLICATIONS

International Search Report for PCT/JP2024/011858 (PCT/ISA/210) mailed on Jun. 4, 2024.

(Continued)

*Primary Examiner* — Stefanie J Cohen
(74) *Attorney, Agent, or Firm* — Birch, Stewart, Kolasch & Birch, LLP

(57) ABSTRACT

A modified metal oxide particle sol, when applied as a coating onto a substrate, is capable of having transparency, a high particle refractive index and good coat resistivity. The modified metal oxide particle sol is composed of modified metal oxide particles (iii) in which stannic oxide particles (i) having an average primary particle size of 4 to 50 nm serve as cores and are coated with metal oxide particles (ii) of at least one metal oxide selected from the group consisting of antimony oxide, stannic oxide and silicon oxide and having an average primary particle size of 1 to 10 nm, which modified metal oxide particles (iii) are dispersed in an organic solvent. The average primary particle size of the core particles (i) and the average primary particle size of the coating particles (ii) satisfy the relationship size of core particles(i)≥size of coating particles(ii), the ratio (total weight of metal oxides other than stannic oxide)/(weight of stannic oxide) is from 0.005 to 1.0, and the sol includes an amine (a) having a water solubility of 0.1 g/L or more and an amine (b) having a water solubility of less than 0.1 g/L.

21 Claims, No Drawings

(56) References Cited

OTHER PUBLICATIONS

Written Opinion of the International Searching Authority for PCT/JP2024/011858 (PCT/ISA/237) mailed on Jun. 4, 2024.
Korean Office Action for Korean Application No. 10-2024-7032277, dated Dec. 6, 2024, with English translation.
Extended European Search Report for European Application No. 24762239.2, dated Jan. 9, 2026.

* cited by examiner

CONDUCTIVE STANNIC OXIDE PARTICLE-CONTAINING ORGANIC SOLVENT-DISPERSED SOL AND METHOD OF PRODUCTION THEREOF

TECHNICAL FIELD

The present invention relates to an organic solvent-dispersed sol containing electrically conductive colloidal particles of stannic oxide (also referred to herein as modified oxide particles), and to a method for producing the same.

BACKGROUND ART

Although high-purity stannic oxide itself is electrically insulating, when doped with indium or antimony, electronic conductivity emerges. Stannic oxide exhibits electronic conductivity due to oxygen defects as well. It has been disclosed that, by utilizing these qualities of stannic oxide particles to form a transparent, electrically conductive, coating agent, a transparent conductive coat can be obtained by applying the coating agent to a film or the like (see Patent Document 1).

Also, a modified metal oxide sol in which the surfaces of core particles are covered with coating particles has been described, this sol being obtained by hydrothermally treating, at a pressure of from 0.1 to 40 MPa and a temperature of between 100° C. and 350° C., a water-soluble amine-containing aqueous sol of stannic oxide having an average particle size of from 4 to 50 nm so as to produce a core particle-containing aqueous sol, then mixing therewith, as the coating particles, an aqueous sol of composite colloidal particles of antimony oxide and silicon dioxide having an average particle size of 5 nm or less or a water-soluble amine-containing aqueous sol of colloidal particles of antimony pentoxide having an average particle size of from 1 to 10 nm (see Patent Document 2).

PRIOR ART DOCUMENTS

Patent Documents

Patent Document 1: JP-B S35-6616
Patent Document 2: JP-A 2006-176392

SUMMARY OF INVENTION

Technical Problem

The present invention provides an organic solvent sol containing modified metal oxide particles (iii) in which stannic oxide particles (i) serve as cores and are covered with at least one type of metal oxide particle (ii) selected from the group consisting of antimony oxide, stannic oxide and silicon oxide, which modified metal oxide particles (iii) have a high electrical conductivity and a high refractive index. These particles are stably dispersed within an organic solvent, enabling the sol, when applied as a coating onto a substrate, to have transparency, a particle refractive index and coat resistivity.

Solution to Problem

The invention provides, in a first aspect, a modified metal oxide sol comprising modified metal oxide particles dispersed in an organic solvent, the modified metal oxide particles (iii) comprising, as cores, stannic oxide particles (i) which have an average primary particle size of from 4 to 50 nm and are coated with metal oxide particles (ii) that have an average primary particle size of from 1 to 10 nm and are composed of at least one metal oxide selected from the group consisting of antimony oxide, stannic oxide and silicon oxide, wherein the average primary particle size of the particles (i) and the average primary particle size of the coating particles (ii) satisfy the relationship size of core particles(i)≥size of coating particles(ii), the ratio "(total weight of metal oxides other than stannic oxide)/(weight of stannic oxide)" is from 0.005 to 1.0, and the sol includes an amine (a) having a water solubility of 0.1 g/L or more and an amine (b) having a water solubility of less than 0.1 g/L.

In a second aspect, the modified metal oxide sol according to the first aspect of the invention has an average particle size according to dynamic light scattering is from 5 to 100 nm.

In a third aspect, the stannic oxide particles (i) serving as core particles in the modified metal oxide sol according to the first or second aspect of the invention are hydrothermally treated stannic oxide particles.

In a fourth aspect, the stannic oxide particles (i) serving as core particles in the modified metal oxide sol according to any one of the first to third aspects of the invention have a degree of crystallization according to x-ray diffractometry which is at least 60%.

In a fifth aspect, the metal oxide particles (ii) serving as coating particles in the modified metal oxide sol according to any one of the first to fourth aspects of the invention are antimony oxide particles or composite particles of stannic oxide and silicon oxide in a weight ratio of between 1:0.1 and 1:10.0.

In a sixth aspect, amine (a) is included within the modified metal oxide sol according to any one of the first to fifth aspects of the invention in an amount of from 20 to 3,000 ppm.

In a seventh aspect, amine (b) is included within the modified metal oxide sol according to any one of the first to sixth aspects of the invention in an amount of from 1,000 to 30,000 ppm.

In an eighth aspect, amine (a) in the modified metal oxide sol according to any one of the first to seventh aspects of the invention is a primary amine, a secondary amine or a combination thereof.

In a ninth aspect, amine (b) in the modified metal oxide sol according to any one of the first to eighth aspects of the invention is a tertiary amine.

In a tenth aspect, amine (a) in the modified metal oxide sol according to any one of the first to ninth aspects of the invention is at least one amine selected from the group consisting of n-propylamine, di-n-propylamine, isopropylamine, diisopropylamine, n-butylamine, isobutylamine, di-n-butylamine and diisobutylamine.

In an eleventh aspect, amine (b) in the modified metal oxide sol according to any one of the first to tenth aspects of the invention is at least one amine selected from the group consisting of tri-n-butylamine, triisobutylamine, tri-n-pentylamine and triisopentylamine.

In a twelfth aspect, the weight ratio amine (b)/amine (a) in the modified metal oxide sol according to any one of the first to eleventh aspects of the invention is from 3.0 to 200.

In a thirteenth aspect, the modified metal oxide particles (iii) in the modified metal oxide sol according to any one of the first to twelfth aspects of the invention are coated with at least one coating agent selected from the group consisting of compounds of formulas (1) to (6) below

[Chem. 1]

(1)

$$R^1_aSi(R^2)_{4-a}$$

(2)

$$[R^3_bSi(R^4)_{3-b}]_2Y_c$$

(3)

$$R^5_dSi(R^6)_{4-d}$$

[Chem. 2]

(4)

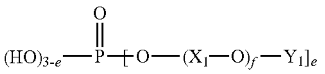

(5)

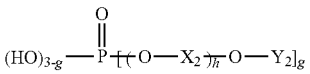

(6)

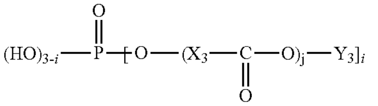

[where, in formula (1), each $R^1$ is an alkyl group, a halogenated alkyl group, an alkenyl group, an aryl group or an organic group having a polyether, epoxy, (meth)acryloyl, mercapto, amino, ureido or cyano group, and is bonded to a silicon atom via a Si—C bond, each $R^2$ is an alkoxy group, an acyloxy group or a halogen group, and the letter 'a' is an integer from 1 to 3;

in formulas (2) and (3), $R^3$ and $R^5$ are each independently an alkyl group of 1 to 3 carbon atoms or an aryl group of 6 to 30 carbon atoms and is bonded to a silicon atom via a Si—C bond, $R^4$ and $R^6$ are each independently an alkoxy group, an acyloxy group or a halogen group, Y is an alkylene group, an NH group or an oxygen atom, b is an integer from 1 to 3, c is the integer 0 or 1, and d is an integer from 1 to 3; and in formulas (4) to (6), $X_1$, $X_2$ and $X_3$ are each independently an alkylene group of 2 to 20 carbon atoms; f, h and j are each integers from 1 to 100, e.g., and i are each integers from 1 to 3, and $Y_1$, $Y_2$ and $Y_3$ are each independently a hydrogen atom, an alkyl group of 1 to 20 carbon atoms, an alkenyl group of 2 to 20 carbon atoms, an aryl group of 6 to 30 carbon atoms or a (meth)acryl group].

In a fourteenth aspect, the organic solvent in the modified metal oxide sol according to any one of the first to thirteenth aspects of the invention is an alcohol, a ketone, an ester, an ether, an amide, a hydrocarbon, a cyano group-containing solvent, a halogen-containing solvent, a sulfonyl group-containing solvent, a carboxyl group-containing solvent, or a mixed solvent thereof.

In a fifteenth aspect, the alcohol in the modified metal oxide sol according to the fourteenth aspect of the invention is a monohydric alcohol of 1 to 20 carbon atoms or a polyhydric alcohol of 1 to 20 carbon atoms.

In a sixteenth aspect, the invention provides an antistatic composition which includes the modified metal oxide particles (iii) within the modified metal oxide sol according to any one of the first to fifteenth aspects of the invention.

In a seventeenth aspect, the invention provides a composition for an electron transport material, which composition includes the modified metal oxide particles (iii) within the modified metal oxide sol according to any one of the first to fifteenth aspects of the invention.

In an eighteenth aspect, the invention provides a method for producing the organic solvent sol of modified metal oxide particles according to any one of the first to fifteenth aspects of the invention, which method includes the steps of:

(A) preparing an aqueous sol of stannic oxide particles (i) having an average primary particle size of from 4 to 50 nm, which sol includes an amine (a) having a water solubility of 0.1 g/L or more;

(B) preparing an aqueous sol of metal oxide particles (ii) of at least one metal oxide selected from the group consisting of antimony oxide, stannic oxide and silicon oxide and having an average primary particle size of from 1 to 10 nm, which sol includes an amine (a) having a water solubility of 0.1 g/L or more;

(C) mixing the aqueous sol of stannic oxide particles (i) obtained in Step (A) with the aqueous sol of metal oxide particles (ii) obtained in Step (B) in a weight ratio, expressed as (total weight of metal oxides other than stannic oxide)/(weight of stannic oxide), of from 0.005 to 1.0 to produce modified metal oxide particles (iii) that have, as cores, stannic oxide particles (i) of an average primary particle size of from 4 to 50 nm and are coated with metal oxide particles (ii) composed of at least one metal oxide selected from the group consisting of antimony oxide, stannic oxide and silicon oxide and having an average primary particle size of from 1 to 10 nm, and adding an amine (b) having a water solubility of less than 0.1 g/L; and (D) solvent exchanging the aqueous medium of the aqueous sol of the modified metal oxide particles (iii) obtained in Step (C) to an alcohol having from 1 to 5 carbon atoms.

In a nineteenth aspect, Step (A) in the method for preparing an organic solvent sol of modified metal oxide particles (iii) according to the eighteenth aspect of the invention is the step (A-1) of adding an amine (a) having a water solubility of 0.1 g/L or more to the aqueous sol of stannic oxide particles (i) having an average primary particle size of from 4 to 50 nm and then hydrothermally treating the sol for a period of from 0.01 to 100 hours at a pressure of between 0.1 and 40 MPa and a temperature of between 100° C. and 350° C.

In a twentieth aspect, the method for preparing an organic solvent sol of modified metal oxide particles (iii) according to the eighteenth or nineteenth aspect of the invention further includes, after Step (D), the steps of:

(E) adding at least one coating agent selected from the group consisting of compounds of formulas (1) to (6) below to the organic solvent sol of modified metal oxide particles (iii) and surface-treating the modified metal oxide particles (iii); and/or (F) solvent exchanging the alcohol having from 1 to 5 carbon atoms in the alcohol solvent sol of modified metal oxide particles (iii) to an alcohol other than that used in Step (D), a ketone, an ester, an ether, an amide, a hydrocarbon, a cyano group-containing solvent, a halogen-containing solvent, a sulfonyl group-containing solvent, a carboxyl group-containing solvent, or a mixed solvent thereof $$R^1{}_aSi(R^2)_{4-a} \quad (1)$$

$$(R^3{}_bSi(R^4)_{3-b})_2Y_c \quad (2)$$

$$R^5{}_dSi(R^6)_{4-d} \quad (3)$$

(4)

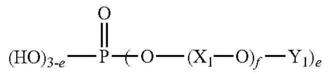

(5)

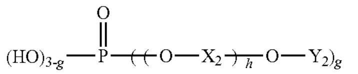

(6)

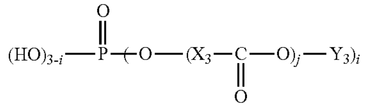

[where, in formula (1), each $R^1$ is an alkyl group, a halogenated alkyl group, an alkenyl group, an aryl group or an organic group having a polyether, epoxy, (meth)acryloyl, mercapto, amino, ureido or cyano group and is bonded to a silicon atom via a Si—C bond, each $R^2$ is an alkoxy group, an acyloxy group or a halogen group, and the letter 'a' is an integer from 1 to 3; in formulas (2) and (3), $R^3$ and $R^5$ are each independently an alkyl group of 1 to 3 carbon atoms or an aryl group of 6 to 30 carbon atoms and are each bonded to a silicon atom via a Si—C bond, $R^4$ and $R^6$ are each independently an alkoxy group, an acyloxy group or a halogen group, Y is an alkylene group, an NH group or an oxygen atom, b is an integer from 1 to 3, c is the integer 0 or 1, and d is an integer from 1 to 3; and in formulas (4) to (6), $X_1$, $X_2$ and $X_3$ are each independently an alkylene group of 2 to 20 carbon atoms, f, h and j are each integers from 1 to 100, e, g and i are each integers from 1 to 3, and $Y_1$, $Y_2$ and $Y_3$ are each independently a hydrogen atom, an alkyl group of 1 to 20 carbon atoms, an alkenyl group of 2 to 20 carbon atoms, an aryl group of 6 to 30 carbon atoms or a (meth)acryl group].

Advantageous Effects of Invention

This invention makes use of modified metal oxide particles (iii) in which stannic oxide particles (i) serve as core particles and metal oxide particles (ii) composed of at least one metal oxide selected from the group consisting of antimony oxide, stannic oxide and silicon oxide serve as coating particles which cover the surfaces of the core particles.

Aqueous sols of colloidal metal oxide particles that are stably dispersed in an aqueous medium can be used for both the core particles and the coating particles. These aqueous sols can be mixed together. For example, an aqueous sol containing the modified metal oxide particles (iii) can be obtained by adding an aqueous sol containing the coating particles (ii) to an aqueous sol containing the core particles (i). An amine (a) having a water solubility of 0.1 g/L or more must be included in order to stably disperse these aqueous sols in an aqueous medium. Cation exchange is carried out before, or after, mixing both the aqueous sol containing core particles (i) and the aqueous sol containing coating particles (ii), as a result of which portions of these are removed. However, at the stage where, following mixture, the aqueous sol of modified metal oxide particles (iii) is then subjected to solvent exchange in which the aqueous medium is replaced with an organic solvent, creating an organic solvent sol of the modified metal oxide particles (iii), by having both an amine (a) with a water solubility of 0.1 g/L or more and an amine (b) with a water solubility of less than 0.1 g/L be present, it is possible to replace the aqueous medium with an organic solvent, enabling an organic solvent sol of the modified metal oxide particles (iii) that is free of agglomeration to be produced.

It is also possible to hydrothermally treat the core particles (i), such hydrothermal treatment being carried out for a period of from 0.01 to 100 hours at a pressure of between 0.1 and 40 MPa and a temperature of between 100° C. and 350° C. It is desirable for the core particles to be stably dispersed within an aqueous medium. To this end, an amine (a) having a water solubility of 0.1 g/L or more is required.

The sol in this invention is a sol of modified metal oxide particles (iii) dispersed in an organic solvent. Due to solvent exchange from an aqueous medium to an organic solvent, in order to enhance the dispersibility of the modified metal oxide particles (iii) in the organic solvent, it is necessary to include an amine (b) having a water solubility of less than 0.1 g/L.

DESCRIPTION OF EMBODIMENTS

The present invention relates to a modified metal oxide sol containing modified metal oxide particles (iii) comprised of, as cores, stannic oxide particles (i) which have an average primary particle size of from 4 to 50 nm and are coated with metal oxide particles (ii) that have an average primary particle size of from 1 to 10 nm and are composed of at least one metal oxide selected from the group consisting of antimony oxide, stannic oxide and silicon oxide. The average primary particle size of the core particles (i) and the average primary size of the coating particles (ii) satisfy the relationship $$\text{size of core particles(i)} \geq \text{size of coating particles(ii)},$$

the ratio (total weight of metal oxides other than stannic oxide)/(weight of stannic oxide) is from 0.005 to 1.0, and the sol includes an amine (a) having a water solubility of 0.1 g/L or more and an amine (b) having a water solubility of less than 0.1 g/L.

Methods that can be used to measure the solubility of chemical substances in water include the column elution method in the case of low solubilities and the flask method in the case of high solubilities. For example, the measurement method specified in the OECD Test Guideline 105 (solubility in water) may be used.

As used herein, "metal oxides other than stannic oxide" refers to metal oxides in which the metal constituent is a metal other than tin.

The average primary particle sizes of the stannic oxide particles (i) and the metal oxide particles (ii) can be measured by transmission electron microscopy.

The sol containing the modified metal oxide particles (iii) can be measured by dynamic light scattering. The average particle size obtained by dynamic light scattering is preferably from 5 to 100 nm, from 10 to 60 nm, or from 10 to 50 nm.

The stannic oxide particles (i) having an average primary particle size of from 4 to 50 nm used as a starting material in this invention can be prepared as an aqueous sol containing the stannic oxide particles (i).

For example, it can easily be produced in the form of a sol of colloidal particles having a particle size of from about 4 to about 50 nm by, for example, such methods as the ion exchange method, peptization method, hydrolysis method or reaction method.

Examples of the ion exchange method include the method of treating a stannate such as sodium stannate with a hydrogen form cation exchange resin, or the method of treating a stannic salt such as stannic chloride or stannic nitrate with a hydroxyl form anion exchange resin. Examples of the peptization method include the method of washing a stannic hydroxide gel obtained by neutralizing a stannic salt with a base or neutralizing stannic acid with hydrochloric acid, followed by peptization with an acid or a base. Examples of the hydrolysis method include the method of hydrolyzing a tin alkoxide, or the method of hydrolyzing basic stannic chloride under heating and then removing unnecessary acid. An example of the reaction method is the method of reacting a metallic tin powder with an acid.

An aqueous sol containing the stannic oxide particles (i) serving as the starting material can also be obtained by a reaction between metallic tin and a hydrogen peroxide solution.

The metallic tin can be used in a powdered or granular form. For example, an atomized metallic tin powder obtained by smelting an ingot and spray solidification, or a flake-like metallic tin powder produced by cutting an ingot on a lathe or rasping it with a file can be used.

A commercially available 35 wt % solution may be used at the desired concentration as the hydrogen peroxide. For example, an aqueous solution of stannic acid can be obtained by preparing an aqueous solution of an organic acid such as oxalic acid having a concentration of from 1 to 30 wt %, or from 5 to 20 wt %, and adding a hydrogen peroxide solution and metallic tin to this aqueous organic acid solution, either at the same time or in alternation. An aqueous solution of an organic acid such as oxalic acid is placed in a reactor equipped with a stirrer, and the hydrogen peroxide solution and metallic tin are each added under stirring from separate addition ports, either at the same time or in alternation. Because the tin oxide colloidal aggregate-containing slurry is acidic, it is preferable to use a glass reactor or a glass-lined (enamel) reactor as the reactor in these steps.

The hydrogen peroxide solution and metallic tin are added to the aqueous solution of an organic acid such as oxalic acid while keeping the molar ratio $H_2O_2/Sn$ therebetween at from 2 to 3. An example of such a method is a split addition process in which the following series of operations are repeated from 3 to 30 times: collect $1/3^{rd}$ to $1/30^{th}$ portions of the respective total weights of the aqueous hydrogen peroxide and metallic tin to be added, add the portion of aqueous hydrogen peroxide and subsequently add the portion of metallic tin to the aqueous solution of an organic acid such as oxalic acid, and carry out the reaction for a period of from 2 to 20 minutes.

The reaction is possible even if the $H_2O_2/Sn$ molar ratio slightly exceeds 3, but it is not desirable for the ratio to exceed this level by a lot. A $H_2O_2/Sn$ molar ratio below 2 is undesirable because of insufficient oxidation. The addition of aqueous hydrogen peroxide and metallic tin may be carried out over a period of from 0.4 to 10 hours, and preferably from 0.4 to 5 hours. At an addition time of less than 0.4 hour, the exothermic reaction is vigorous and becomes impossible to control, in addition to which unreacted metallic tin tends to remain behind, which is undesirable. Although an addition time of more than 10 hours is possible, this is uneconomical and thus undesirable.

The reaction of metallic tin and hydrogen peroxide solution in the aqueous solution of an organic acid such as oxalic acid is carried out at between 30° C. and 95° C., preferably between 40° C. and 85° C. The reaction between hydrogen peroxide and metallic tin is an oxidation reaction, and therefore is exothermic. Because the hydrogen peroxide decomposition reaction occurs at the same time and also is exothermic, temperature control at the time of the reaction requires care; if necessary, cooling may be carried out. Although the reaction temperature may be below 30° C., because the reaction is exothermic, surplus cooling is required and so the reaction takes too much time, making it uneconomical. A reaction temperature of 95° C. or more is undesirable because coarse colloidal particles end up forming.

Excess electrolyte (primarily anions) is removed from the resulting stannic oxide colloidal aggregate slurry, and the stannic oxide colloidal particles are peptized to give a sol. By removing excess electrolyte, a sol in which the stannic oxide colloidal particles are dispersed in a nearly primary particle state can be obtained. Such washing can be carried out by, for example, a method in which the aggregate is precipitated out and the supernatant is decanted off, by ultrafiltration, or by an ion exchange method. However, when a large amount of electrolyte is present, a washing method that involves repeatedly carrying out the sequence of ultrafiltration, water addition and ultrafiltration once again (ultrafiltration-water addition-ultrafiltration) is especially preferred. The stannic oxide composite colloidal particles obtained by this step have an average primary particle size of from 4 to 50 nm, or from 10 to 20 nm.

The step of anion exchanging the stannic oxide aqueous sol can be added. With such anion exchange treatment, a stable sol can be obtained even at a high concentration. A commercial anion exchange resin can be used in anion exchange, the anion exchange resin being used following preparation of the resin to the hydroxyl form. Anion exchange can easily be carried out by passing the stannic oxide aqueous sol through an anion exchange resin-packed column. The sol is preferably passed through the column at a temperature of between 0° C. and 60° C. and at a rate, expressed in terms of the space velocity SV, of from 1 to 10 hours.

Before and/or after anion exchange treatment, the stability can be enhanced by adding a basic substance to the aqueous sol of stannic oxide. The basic substance used is preferably an organic base. For example, amine (a) having a water solubility of 0.1 g/L or more, from 0.1 to 5,000.0 g/L, from 0.1 to 3,000.0 g/L, from 0.1 to 2,000.0 g/L, from 0.5 to 2,000.0 g/L, from 1.0 to 2,000.0 g/L, from 10.0 to 2,000.0 g/L, or from 100 to 1,000.0 g/L can be used.

Amine (a) can be added in an amount of from 20 to 3,000 ppm, or from 20 to 1,000 ppm. A primary amine, a secondary amine, or an amine consisting of a combination of these may be used as amine (a). For example, at least one amine selected from the group consisting of n-propylamine, di-n-propylamine, isopropylamine, diisopropylamine, n-butylamine, isobutylamine, di-n-butylamine and diisobutylamine may be used as amine (a).

In the practice of this invention, the stannic oxide particles (i) serving as core particles have a degree of crystallization according to x-ray diffractometry that is preferably 60% or more, or 65% or more, and preferably up to 100%. Stannic oxide particles for which the range in the degree of crystallization is from 60 to 95%, or from 65 to 95%, may typically be used. A degree of crystallization of 60% or more is preferred, although the degree of crystallization may typically be set to from 60 to 99%, or from 60 to 95%.

In this invention, a stannic oxide aqueous sol having a $SnO_2$ concentration of from 1 to 50 wt % produced by the above-described method can be used directly as is, although hydrothermally treated stannic oxide particles can be produced by 0.01 to 100 hours of hydrothermal treatment under applied pressure at between 100° C. and 350° C. Hydrothermal treatment involves, for example, placing the above stannic oxide aqueous sol in an autoclave and treating it for a period of 0.01 to 100 hours under a pressure of between 0.1 and 40 MPa and at a temperature of between 100° C. and 350° C.

The medium in these stannic oxide sols may be water or a hydrophilic organic solvent, although an aqueous sol in which the medium is water is preferred. The pH of the sol is preferably a value that stabilizes the sol; a value of from about 0.2 to about 11.5 is generally good. Any ingredients for stabilizing the sol, such as alkaline substances, acidic substances or oxycarboxylic acids, may be included within the stannic oxide sol so long as the objects of the invention can be attained. The concentration of the stannic oxide sol used, in terms of the stannic oxide, is from about 0.5 wt % to about 50 wt %, although it is desirable for this concentration to be on the low side, and preferably from 1 to 30 wt %.

It is especially preferable to use an alkaline sol stabilized with an organic base such as the above amines as the stannic oxide sol. Addition of the amines is preferably carried out at between 5° C. and 100° C., and more preferably at between room temperature (20° C.) and 60° C. This mixture is carried out by adding the above amines to the stannic oxide sol under stirring; mixing must be thoroughly carried out, preferably for a period of from 0.5 to 3 hours.

The coating particles (ii) used in this invention may be in the form of an aqueous sol of coating particles. The coating particles (ii) may be particles of antimony oxide alone (ii-1) or composite particles of stannic oxide and silicon oxide (ii-2) in a weight ratio of stannic oxide to silicon dioxide of from 1:0.1 to 1:10.0.

Alkylamide-containing antimony pentoxide colloidal particles (ii-1) can be obtained by, for example, an oxidation method or an acid decomposition method. Examples of acid decomposition methods include methods that react an alkali antimonate with an inorganic acid and then peptize with an amine (JP-A S60-41536, JP-A S61-227918, JP-A 2001-123115). Examples of oxidation methods include methods which oxidize antimony trioxide with hydrogen peroxide in the presence of an amine or an alkali metal (JP-B S57-11848, JP-A S59-232931), and methods which oxidize antimony trioxide with hydrogen peroxide, and then add an amine or an alkali metal. For example, the above amine (a) having a water solubility of 0.1 g/L or more may be used as the amine. Amine (a) may be added in an amount of from 20 to 3,000 ppm, or from 20 to 1,000 ppm. A primary amine, a secondary amine, or an amine obtained by combining these may be used as amine (a). For example, at least one amine selected from the group consisting of n-propylamine, di-n-propylamine, isopropylamine, diisopropylamine, n-butylamine, isobutylamine, di-n-butylamine and diisobutylamine may be used as amine (a).

The alkylamine-containing antimony pentoxide colloidal particles (ii-1) are fine colloidal particles of antimony pentoxide, the particle size for oligomer or primary particles as determined by electron microscopy being from about 1 nm to about 20 nm. The amine constituent is preferably an alkylamine salt of diisopropylamine or the like, and the molar ratio amine/$Sb_2O_5$ is from 0.02 to 4.00.

Alkylamine-containing silicon dioxide particles may be further added to the amine-containing antimony pentoxide colloidal particles in the above coating sol.

An antimony pentoxide and silicon dioxide composite colloid that is capable of being used as the coating sol can be obtained by the known method described below (see, for example, JP-B S50-40119). That is, the colloid can be obtained by mixing an aqueous solution of an alkali silicate or a silicic acid solution with an aqueous solution of an alkali antimonate, followed by decationization with a cation exchange resin.

An aqueous solution of potassium antimonate can be preferably used as the antimony source. Sodium silicate, potassium silicate and active silicic acid obtained by cation exchanging these can be used as the silicon dioxide source. The molar ratio $SiO_2/Sb_2O_5$ is from 0.55 to 55. The particle size for oligomer or average primary particles as determined by electron microscopy is 5 nm or less, and preferably from 1 to 5 nm.

The colloidal particles (ii-2) of stannic oxide and silicon dioxide composite used in the coating sol of the invention can be obtained by the method of preparing an aqueous solution containing a stannate and a silicate in a weight ratio $SiO_2/SnO_2$ of from 0.1 to 10, and removing cations present in the resulting aqueous solution. The total concentration of the $SnO_2$ and $SiO_2$ included in this sol is generally 40 wt % or less; for practical purposes, it is preferably 2 wt % or more, and more preferably from 5 to 30 wt %.

This sol contains substantially no alkali constituents and can be stably present. However, stabilization while including alkali constituents is also possible. Such alkali constituents may be included in an amount of, as amine (a), from 20 to 3,000 ppm, or from 20 to 1,000 ppm. Primary amines, secondary amines, and amines that are combinations thereof can be used as amine (a). For example, one or more amine selected from the group consisting of n-propylamine, di-n-propylamine, isopropylamine, diisopropylamine, n-butylamine, isobutylamine, di-n-butylamine and diisobutylamine may be used as amine (a). These alkali constituents may be included in an amount of up to be 30 wt %, based on the total amount of $SnO_2$ and $SiO_2$. Or two or more of these may be mixed and included. By adding amine (a) in an amount of from 20 to 3,000 ppm, the dissolved amine within the sol adsorbs to the surfaces of the modified metal oxide particles, increasing the dispersion stability.

This sol is a liquid which has a pH of from 1 to 9 and ranges from clear and colorless to having a slightly colloidal color. It is stable at room temperature for 3 months or more, and at 60° C. for one month or more. Precipitate does not form in this sol. Nor does this sol thicken or give rise to gelation.

Preferred examples of stannates and silicates that may be used in producing this sol are sodium stannate ($Na_2SnO_3 \cdot 3H_2O$) and sodium silicate (water glass). Use can also be made of stannic acid, silicic acid or the like dissolved in an aqueous solution of an alkali metal hydroxide. Exemplary methods include preparing an aqueous solution by dissolving powders of the stannate and the silicate in water, preparing an aqueous solution by mixing together an aqueous solution of the stannate and an aqueous solution of the silicate, and preparing an aqueous solution by adding a powder of the stannate and an aqueous solution of the silicate to water. The aqueous solution of stannate preferably has a $SnO_2$ concentration of about 0.1 to 30 wt %, although use at a higher concentration than this is also possible. The aqueous solution of silicate preferably has a $SiO_2$ concentration of about 0.1 to 30 wt %, although use at a higher concentration than this is also possible.

It is desirable to carry out preparation of the aqueous solution at from room temperature (about 20° C.) to 100° C., and preferably at from room temperature (20° C.) to about 60° C. The aqueous solution to be mixed has a $SiO_2/SnO_2$ weight ratio of preferably from 0.1 to 100. Next, the cations present in the aqueous solution obtained here are removed, giving an aqueous sol. Decationizing treatment can be carried out by bringing the aqueous solution into contact with a hydrogen form ion exchange material or by salting out. The hydrogen form cation exchange material that may be used here is one that is commonly used; advantageous use can be made of a commercially available hydrogen form cation exchange resin.

When this sol has a low concentration, where necessary, the concentration of the sol can be increased by a typical method of concentration such as evaporation or ultrafiltration. Ultrafiltration is especially preferred. Even at this concentration, it is preferable to maintain the temperature of the sol at about 100° C. or below, and especially at 60° C. or below. Although there is no particular lower limit, it is preferable to maintain the temperature at 10° C. or more, and more preferable to maintain it at 20° C. or more.

The modified stannic oxide colloidal particles (iii-1) of the invention that are coated on the surface with amine-containing $Sb_2O_5$ colloidal particles (ii-1) are negatively charged within the sol. The stannic oxide particles (i) are positively charged, and the $Sb_2O_5$ colloid is negatively charged. Therefore, with mixing, the negatively charged $Sb_2O_5$ colloidal particles (ii-1) presumably are electrically drawn around the positively charged stannic oxide colloidal particles (i) and bond by way of chemical bonds onto the surfaces of the positively charged colloidal particles so that the positively charged particles serving as the cores end up being covered on the surface by the negatively charged $Sb_2O_5$, forming modified stannic oxide colloidal particles (iii-1).

When mixing together the stannic oxide colloidal particles (i) having an average primary particle size of from 4 to 50 nm as the core sol and the amine-containing $Sb_2O_5$ colloid (ii-1) as the coating sol, a stable sol cannot be obtained at less than 1 part by weight of the metal oxide in the coating sol per 100 parts by weight of the metal oxide ($SnO_2$) in the core sol. This is likely because when the amount of $Sb_2O_5$ colloid is inadequate, the surfaces of the stannic oxide colloidal particles serving as the cores in the composite colloidal particles are insufficiently coated, allowing the formed colloidal particles to readily agglomerate, which destabilizes the formed sol. Therefore, the amount of $Sb_2O_5$ colloidal particles to be mixed may be lower than the amount that covers the total surfaces of the stannic oxide colloidal particles, but is at least the minimum amount required to enable a stable modified stannic oxide particle sol to form. When an amount of $Sb_2O_5$ colloidal particles in excess of this amount that may be used for surface covering has been used in the above mixture, the resulting sol is simply a stable mixed sol of the $Sb_2O_5$ colloidal particle sol and the resulting modified stannic oxide colloidal particle sol.

The stannic oxide colloidal particles (i) are positively charged, and the composite colloid (ii-2) of stannic oxide and silicon dioxide is negatively charged. Therefore, presumably, the negatively charged composite colloid (ii-2) of stannic oxide and silicon dioxide is electrically drawn around the positively charged stannic oxide colloidal particles (i) and the composite colloid of stannic oxide and silicon dioxide bonds by way of chemical bonds onto the surfaces of the positively charged colloidal particles such that the negatively charged composite colloid of stannic oxide and silicon dioxide ends up covering the surfaces of the positively charged particles serving as the cores, thereby forming modified stannic oxide colloidal particles (iii-2).

When mixing together the stannic oxide colloidal particles (i) having an average primary particle size of from 4 to 50 nm as the core sol and the composite colloid (ii-2) of stannic oxide and silicon dioxide as the coating sol, a stable sol cannot be obtained at less than 1 part by weight of the metal oxide serving as the coating sol per 100 parts by weight of the metal oxide ($SnO_2$) serving as the core sol. This is likely because when the amount of the composite colloid (ii-2) of stannic oxide and silicon dioxide is inadequate, the surfaces of the stannic oxide colloidal particles serving as the cores in the composite colloidal particles are insufficiently covered, allowing the formed colloidal particles to readily agglomerate and thus destabilizing the formed sol. Therefore, the amount of the composite colloidal particles of stannic oxide and silicon dioxide to be mixed may be lower than the amount that covers the entire surfaces of the stannic oxide or stannic oxide-zirconium oxide composite colloidal particles, but is an amount that is at least the minimum amount required to enable a stable modified stannic oxide particle sol to form. When an amount of composite colloidal particles of stannic oxide and silicon dioxide that exceeds this amount used for surface covering has been used in the above mixture, the resulting sol is simply a stable mixed sol of the stannic oxide and silicon dioxide composite colloidal particle sol and the resulting modified stannic oxide colloidal particle sol.

The amount of the composite colloid of stannic oxide and silicon dioxide used to modify the stannic oxide colloidal particles by covering their surfaces is preferably not more than 50 parts by weight, based on the metal oxide within the coating sol, per 100 parts by weight of the metal oxide ($SnO_2$) of the core sol The sol of the invention is obtained by a method that includes Steps (A) to (D) below:

(A) preparing an aqueous sol of stannic oxide particles (i) having an average primary particle size of from 4 to 50 nm, which sol includes an amine (a) having a water solubility of 0.1 g/L or more;

(B) preparing an aqueous sol of metal oxide particles (ii) of at least one metal oxide selected from the group consisting of antimony oxide, stannic oxide and silicon oxide and having an average primary particle size of from 1 to 10 nm, which sol includes an amine (a) having a water solubility of 0.1 g/L or more;

(C) mixing the aqueous sol of stannic oxide particles (i) obtained in Step (A) with the aqueous sol of metal oxide particles (ii) obtained in Step (B) in a weight ratio, expressed as (total weight of metal oxide other than stannic oxide)/(weight of stannic oxide), of from 0.005 to 1.0 to produce modified metal oxide particles (iii) that have, as cores, stannic oxide particles (i) of an average primary particle size of from 4 to 50 nm and are coated with metal oxide particles (ii) composed of at least one metal oxide selected from the group consisting of antimony oxide, stannic oxide and silicon oxide and having an average primary particle size of from 1 to 10 nm, and adding an amine (b) having a water solubility of less than 0.1 g/L; and (D) solvent exchanging the aqueous medium of the aqueous sol of the modified metal oxide particles (iii) obtained in Step (C) to an alcohol having from 1 to 5 carbon atoms.

In the practice of the invention, Step (A) may employ the step (A-1) of adding an amine (a) having a water solubility of 0.1 g/L or more to the aqueous sol of stannic oxide particles (i) having an average primary particle size of from 4 to 50 nm and then hydrothermally treating the sol for a period of from 0.1 to 100 hours at a pressure of between 0.1 and 40 MPa and a temperature of between 100° C. and 350° C.

In this invention, the mixture in Step (C) of the aqueous sol of stannic oxide particles (i) obtained in Step (A) and the aqueous sol of metal oxide particles (ii) of at least one metal oxide selected from the group consisting of antimony oxide, stannic oxide and silicon oxide obtained in Step (B) preferably involves mixture such that the modified metal oxide particles (iii) satisfy the condition that the (total weight of metal oxide other than stannic oxide)/(weight of stannic oxide) is from 0.005 to 1.0, from 0.005 to 0.5, from 0.01 to 0.5, from 0.01 to 0.3, from 0.01 to 0.2 or from 0.04 to 0.15.

The amine (b) having a water solubility of less than 0.1 g/L used in Step (C) is exemplified by tertiary amines having a water solubility of less than 0.1 g/L, a water solubility of at least 0.00001 g/L and less than 0.1 g/L, a water solubility of at least 0.00002 g/L and less than 0.1 g/L, a water solubility of at least 0.00003 g/L and less than 0.1 g/L, a water solubility of at least 0.00005 g/L and less than 0.1 g/L, a water solubility of at least 0.0001 g/L and less than 0.1 g/L, a water solubility of at least 0.001 g/L and less than 0.1 g/L, a water solubility of at least 0.01 g/L and less than 0.1 g/L, a water solubility of at least 0.00003 g/L and up to 0.08 g 0.1 g/L, a water solubility of at least 0.00003 g/L and up to 0.05 g/L, or a water solubility of at least 0.00003 g/L and up to 0.03 g/L. Examples include one or more amine selected from the group consisting of tri-n-butylamine, triisobutylamine, tri-n-pentylamine and triisopentylamine.

Amine (a) may be included in the modified metal oxide sol in an amount of from 20 to 3,000 ppm, or an amount of from 20 to 1,000 ppm.

Amine (b) may be included in the modified metal oxide sol in an amount of from 1,000 to 30,000 ppm, or an amount of from 1,000 to 10,000 ppm.

Some of the amine (b) having a water solubility of less than 0.1 g/L that is added in Step (C) appears to be adsorbed onto the surface of the modified metal oxide particles (iii) within the aqueous sol in Step (C). In subsequent Step (D), when the sol dispersion medium is solvent-exchanged from an aqueous medium to an organic solvent, because the above amine (b) is present, the compatibility with the organic solvent increases, enabling the modified metal oxide particles (iii) to disperse in the organic solvent without aggregation. In the organic solvent, the amine (b) migrates from the surface of the modified metal oxide particles (iii) and into the organic solvent. Amine (a) and amine (b) can be detected within the dispersion medium in the organic solvent-dispersed sol of the modified metal oxide particles (iii). Because the modified metal oxide particles (iii) fully disperse in the organic solvent and a sol is stably present, when a coating agent using these has been applied onto a substrate and cured, because the distribution of modified metal oxide particles on the substrate is even, a high refractive index and a good electrical conductivity can be obtained. The refractive index of these modified metal oxide particles is preferably in the range of 1.75 to 2.00.

Examples of the alcohol of 1 to 5 carbon atoms in Step (D) include methanol, ethanol, n-propanol, i-propanol, n-butanol and propylene glycol monomethyl ether.

In the modified metal oxide sol obtained in the invention, the weight ratio expressed as "amine (b)/amine (a)" is preferably from 3.0 to 200, from 3.0 to 100, or from 3.0 to 60.

The method of the invention may further include, after Step (D):

(E) adding at least one coating agent selected from the group consisting of compounds of formulas (1) to (6) to the organic solvent sol of modified metal oxide particles (iii) and surface-treating the modified metal oxide particles (iii); and/or (F) solvent exchanging the alcohol having from 1 to 5 carbon atoms in the alcohol solvent sol of modified metal oxide particles (iii) to an alcohol other than that used in Step (D), a ketone, an ester, an ether, an amide, a hydrocarbon, a cyano group-containing solvent, a halogen-containing solvent, a sulfonyl group-containing solvent, a carboxyl group-containing solvent, or a mixed solvent thereof.

In the coating agent in Step (E), formulas (1) to (3) are silane coupling agents and formulas (4) to (6) are phosphate ester compounds. A silane coupling agent, a phosphate ester compound, or a combination of these may be used as the coating agent.

For example, it is possible to carry out Step (E) after Step (D), to carry out Step (F) after Step (D), or to carry out Step (E) after Step (D) and subsequently carry out Step (F).

Coating can be carried out with, as the silane compound, a hydrolyzate of at least one silane compound selected from the group consisting of compounds of formulas (1) to (3).

In formula (1), each $R^1$ is an alkyl group, a halogenated alkyl group, an alkenyl group, an aryl group or an organic group having a polyether, epoxy, (meth)acryloyl, mercapto, amino, ureido or cyano group, and is bonded to a silicon atom via a Si—C bond; each $R^2$ is an alkoxy group, an acyloxy group or a halogen group; and the letter 'a' is an integer from 1 to 3.

In formulas (2) and (3), $R^3$ and $R^5$ are each independently an alkyl group of 1 to 3 carbon atoms or an aryl group of 6 to 30 carbon atoms and is bonded to a silicon atom via a Si—C bond, $R^4$ and $R^6$ are each independently an alkoxy group, an acyloxy group or a halogen group, Y is an alkylene group, an NH group or an oxygen atom, b is an integer from 1 to 3, c is the integer 0 or 1, and d is an integer from 1 to 3.

The alkyl group is an alkyl group of 1 to 18 carbon atoms. Examples include, but are not limited to, methyl, ethyl, n-propyl, i-propyl, cyclopropyl, n-butyl, i-butyl, s-butyl, t-butyl, cyclobutyl, 1-methylcyclopropyl, 2-methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobuyl, 1,2-dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-i-propylcyclopropyl, 2-i-propylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl, 2-ethyl-3-methylcyclopropyl, hexyl, heptyl, octyl, nonyl, decyl, undecyl, dodecyl, tridecyl, tetradecyl, pentadecyl, hexadecyl, heptadecyl and octadecyl groups.

Examples of the alkylene group include alkylene groups derived from the above alkyl groups.

Examples of the aryl groups include aryl groups of 6 to 30 carbon atoms such as phenyl, naphthyl, anthracenyl and pyrenyl groups.

The alkenyl group is an alkenyl group of 2 to 10 carbon atoms. Examples include, but are not limited to, ethenyl, 1-propenyl, 2-propenyl, 1-methyl-1-ethenyl, 1-butenyl, 2-butenyl, 3-butenyl, 2-methyl-1-propenyl, 2-methyl-2-propenyl, 1-ethylethenyl, 1-methyl-1-propenyl, 1-methyl-2-propenyl, 1-pentenyl, 2-pentenyl, 3-pentenyl, 4-pentenyl, 1-n-propylethenyl, 1-methyl-1-butenyl, 1-methyl-2-butenyl, 1-methyl-3-butenyl, 2-ethyl-2-propenyl, 2-methyl-1-butenyl, 2-methyl-2-butenyl, 2-methyl-3-butenyl, 3-methyl-1-butenyl, 3-methyl-2-butenyl, 3-methyl-3-butenyl, 1,1-dimethyl-2-propenyl, 1-i-propylethenyl, 1,2-dimethyl-1-propenyl, 1,2-dimethyl-2-propenyl, 1-cyclopentenyl, 2-cyclopentenyl, 3-cyclopentenyl, 1-hexenyl, 2-hexenyl, 3-hexenyl, 4-hexenyl, 5-hexenyl, 1-methyl-1-pentenyl, 1-methyl-2-pentenyl, 1-methyl-3-pentenyl, 1-methyl-4-pentenyl, 1-n-butylethenyl, 2-methyl-1-pentenyl and 2-methyl-2-pentenyl groups.

Exemplary alkoxy groups include alkoxy groups of 1 to 10 carbon atoms. Examples include, but are not limited to, methoxy, ethoxy, n-propoxy, i-propoxy, n-butoxy, i-butoxy, s-butoxy, t-butoxy, n-pentyloxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy and n-hexyloxy groups.

Exemplary acyloxy groups include acyloxy groups of 2 to 10 carbon atoms. Examples include, but are not limited to, methylcarbonyloxy, ethylcarbonyloxy, n-propylcarbonyloxy, i-propylcarbonyloxy, n-butylcarbonyloxy, i-butylcarbonyloxy, s-butylcarbonyloxy, t-butylcarbonyloxy, n-pentylcarbonyloxy, 1-methyl-n-butylcarbonyloxy, 2-methyl-n-butylcarbonyloxy, 3-methyl-n-butylcarbonyloxy, 1,1-dimethyl-n-propylcarbonyloxy, 1,2-dimethyl-n-propylcarbonyloxy, 2,2-dimethyl-n-propylcarbonyloxy, 1-ethyl-n-propylcarbonyloxy, n-hexylcarbonyloxy, 1-methyl-n-pentylcarbonyloxy and 2-methyl-n-pentylcarbonyloxy groups.

Exemplary halogen groups include fluorine, chlorine, bromine and iodine.

Exemplary organic groups having a polyether group include polyether propyl groups having alkoxy groups, such as those of the formula $(CH_3O)_3SiC_3H_6(OC_2H_4)_nOCH_3$, where n is in the range of 1 to 100, or 1 to 10.

Exemplary organic groups having an epoxy group include 2-(3,4-epoxycyclohexyl)ethyl and 3-glycidoxypropyl groups.

As used herein, "(meth)acryloyl group" refers to both acryloyl and methacryloyl groups. Examples of organic groups having a (meth)acryloyl group include 3-methacryloxypropyl and 3-acryloxypropyl groups.

An example of an organic group having a mercapto group is the 3-mercaptopropyl group.

Examples of organic groups having an amino group include 2-aminoethyl, 3-aminopropyl, N-2-(aminoethyl)-3-aminopropyl, N-(1,3-dimethylbutyridene)aminopropyl, N-phenyl-3-aminopropyl and N-(vinylbenzyl)-2-aminoethyl-3-aminopropyl groups.

An example of an organic group having a ureido group is the 3-ureidopropyl group.

An example of an organic group having a cyano group is the 3-cyanopropyl group.

The trimethylsilyl groups of above formulas (2) and (3) are preferably compounds that can be formed on the surfaces of silica particles. These compounds are exemplified by the following:

[Chem. 3]

(2-1)

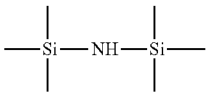

(2-2)

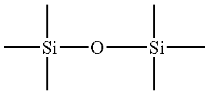

(2-3)

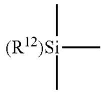

In the above formula, $R^{12}$ is an alkoxy group, examples of which include methoxy and ethoxy groups. Silane compounds available from Shin-Etsu Chemical Co., Ltd. may be used as the above silane compounds.

In this invention, Step (E) below may be carried out after Step (D). Step (E) is the step of covering the surfaces of the modified metal oxide particles (iii) with hydroxyl groups; for example, in the case of silica particles, silanol groups and the above silane compound react, covering the surfaces of the silica particles with the silane compound via siloxane bonds. This step can be carried out at a reaction temperature of from 20° C. to a temperature in the boiling point range for the dispersion medium, such as in the range of 20° C. to 100° C., and over a reaction time of from about 0.1 hour to about 6 hours.

The coating of silica particle surfaces can be carried out by adding the silane compound to the modified metal oxide particle (iii) sol in an amount corresponding to a modified metal oxide particle (iii) surface covering amount, in terms of the number of silicon atoms within the silane compound, of from 0.1 atom/$nm^2$ to 6.0 atoms/$nm^2$.

Water is necessary for hydrolysis of the silane compound, although moisture remaining within the solvent when the aqueous medium has been solvent-exchanged to an organic solvent may be used for this purpose. For example, use can be made of moisture remaining at a level of from 0.01 to 1 wt %. Hydrolysis may be carried out either using a catalyst or without a catalyst.

The phosphate ester is exemplified by at least one phosphate ester compound selected from the group represented by compounds of formulas (4) to (6).

In formulas (4) to (6), $X_1$, $X_2$ and $X_3$ are each independently alkylene groups of 2 to 20 carbon atoms; f, h and j are each integers from 1 to 100; e, g and i are each integers from 1 to 3; and $Y_1$, $Y_2$ and $Y_3$ are each independently a hydrogen atom, an alkyl group of 1 to 20 carbon atoms, an alkenyl group of 2 to 20 carbon atoms, an aryl group of 6 to 30 carbon atoms or a (meth)acryl group.

A polyoxyethylene alkyl ether phosphate ester is preferably used as the phosphate ester. For example, a phosphate ester in which the terminal alkyl group ($Y_1$) in above formula (4) is an alkyl group having from 6 to 10 carbon atoms, or from 12 to 15 carbon atoms, can be used. For example, use can be made of the products available under the trade names Phosphanol RA-600 and RS-610 from Toho Chemical Industry Kogyo KK.

The alkylene group of 2 to 20 carbon atoms is exemplified by alkylene groups derived from the above alkyl groups. The alkenyl group of 2 to 20 carbon atoms and the aryl group of 6 to 30 carbon atoms are exemplified as indicated above.

The coating of modified metal oxide particle surfaces can be carried out by adding the phosphate ester compound to the modified metal oxide particle (iii) sol in an amount corresponding to a modified metal oxide particle (iii) surface covering amount, in terms of the number of phosphorus atoms within the phosphate ester compound, of from 0.1 atom/$nm^2$ to 6.0 atoms/$nm^2$ In this invention, Step (F) below may be added after Step (D).

Step (F) is the step of solvent exchanging the alcohol having from 1 to 5 carbon atoms in the alcohol solvent sol of modified metal oxide particles (iii) obtained in Step (D) to an alcohol other than that used in Step (D), a ketone, an ester, an ether, an amide, a hydrocarbon, a cyano group-containing solvent, a halogen-containing solvent, a sulfonyl group-containing solvent, a carboxyl group-containing solvent, or a mixed solvent thereof.

Alcohols other than that used in Step (D) which can be used in Step (F) are exemplified by monohydric alcohols having from 1 to 20 carbon atoms or from 1 to 10 carbon atoms, and polyhydric alcohols having from 1 to 20 carbon atoms or from 1 to 10 carbon atoms. Examples of monohydric alcohols include methanol, ethanol, n-propanol, i-propanol, n-butanol, propylene glycol monomethyl ether, isobutanol, n-pentanol, ethylene glycol monomethyl ether, propylene glycol monomethyl ether, propylene glycol monoethyl ether, propylene glycol monopropyl ether, 1-octanol, 1-nonanol, 1-decanol, benzyl alcohol, 2-phenoxyethanol, 2-benzyloxyethanol and tetrahydrofurfuryl alcohol. Examples of polyhydric alcohols include ethylene glycol, propylene glycol, diethylene glycol, triethylene glycol, dipropylene glycol, tripropylene glycol, 1,3-butanediol and 2,3-butanediol.

Exemplary ketones include those having from 1 to 20 carbon atoms, or from 1 to 10 carbon atoms, of which aliphatic ketones can be preferably used. Examples include acetone, methyl ethyl ketone, diethyl ketone, methyl propyl ketone, methyl isobutyl ketone, methyl amyl ketone, cyclohexanone, methyl cyclopentanone, isophorone, 4-hydroxy-4-methyl-2-pentanone, methyl-n-propyl ketone, methyl-n-butyl ketone, methyl-n-amyl ketone, 2-heptanone and acetyl acetone.

Exemplary esters include those having from 1 to 20 carbon atoms, or from 1 to 10 carbon atoms, of which aliphatic esters can be preferably used. Examples include methyl formate, ethyl formate, propyl formate, methyl acetate, ethyl acetate, propyl acetate, methyl propionate, ethyl propionate, propyl propionate, methyl acrylate, ethyl acrylate, propyl acrylate, dimethyl maleate, diethyl maleate, dipropyl maleate, dimethyl adipate, diethyl adipate, dipropyl adipate, propylene glycol monomethyl ether acetate, methyl benzoate, ethyl benzoate, butyl benzoate, dimethyl phthalate, dibutyl maleate, diethyl oxalate, dibutyl oxalate, hexyl acetate, benzyl acetate, diethylene glycol monoethyl ether acetate, diethylene glycol monobutyl ether acetate, diethyl malate, diethyl fumarate, dipropylene glycol methyl ether acetate, 1,3-butylene glycol diacetate, propylene glycol diacetate, 1,6-hexanediol diacetate, triacetin, γ-butyrolactone, ethylene carbonate, propylene carbonate, methyl cellosolve acetate, ethyl cellosolve acetate, diethyl cellosolve acetate, phenyl cellosolve acetate, n-butyl acetate, isobutyl acetate, methyl lactate, ethyl lactate, methyl hydroxyacetate, ethyl hydroxyacetate, butyl hydroxyacetate, methoxymethyl acetate, methoxyethyl acetate, methoxy butyl acetate, ethoxymethyl acetate, ethoxyethyl acetate, methyl-3-hydroxy propionate, ethyl-3-hydroxypropionate, methyl-3-methoxypropionate, ethyl-3-methoxypropionate, methyl-3-ethoxypropionate, ethyl-3-ethoxypropionate, methyl-2-hydroxypropionate, ethyl-2-hydroxypropionate, propyl-2-hydroxypropionate, methyl-2-methoxypropionate, ethyl-2-methoxypropionate, ethyl-2-ethoxypropionate, methyl-2-ethoxypropionate, methyl-2-hydroxy-2-methylpropionate, ethyl-2-hydroxy-2-methylpropionate, methyl-2-methoxy-2-methylpropionate, ethyl-2-ethoxy-2-methylpropionate, 2-hydroxy ethylpropionate, 2-hydroxy-2-methylethylpropionate, hydroxyethyl acetate, methyl-2-hydroxy-3-methyl butanoate, ethyl pyruvate, methyl ethyl carbitol, diethyl carbitol, diethylene glycol methyl ethyl ether and diethylene glycol diethyl ether.

Exemplary ethers include those having from 1 to 20 carbon atoms, or from 1 to 10 carbon atoms, of which aliphatic ethers can be preferably used. Examples include dimethyl ether, ethyl methyl ether, diethyl ether, tetrahydrofuran, 1,4-dioxane, anisole, 4-methoxytoluene, diethylene glycol monomethyl ether, ethylene glycol monoethyl ether, diethylene glycol dimethyl ether, diethylene glycol monophenyl ether, triethylene glycol monomethyl ether, dipropylene glycol monomethyl ether, diethylene glycol butyl methyl ether, triethylene glycol dimethyl ether, tripropylene glycol monomethyl ether, 2-(2-isobutoxyethoxy) ethanol and benzyl ethyl ether.

Exemplary amides include those having from 1 to 20 carbon atoms, or from 1 to 10 carbon atoms, such as dimethyl acetamide, dimethyl formamide, N-methylpyrrolidone, N-ethylpyrrolidone, N,N-dimethylisobutylamide, 1,3-dimethyl-2-imidazolidinone, N-methylformamide, N-methylformanilide and N-methylacetamide.

Exemplary hydrocarbons include paraffinic hydrocarbons, naphthenic hydrocarbons and aromatic hydrocarbons having from 6 to 18 carbon atoms, or from 6 to 40 carbon atoms, and mixtures thereof. Examples of n-paraffins include n-hexane, n-heptane, n-octane, n-nonane and n-decane. Examples of i-paraffins include i-octane, i-nonane and i-decane. Examples of aromatic hydrocarbons include toluene, xylene, tetralin, cyclohexylbenzene and decylbenzene.

Examples of cyano group-containing solvents include acetonitrile and 3-methoxypropionitrile.

Examples of halogen-containing solvents include chloroform and chlorobenzene.

An example of a sulfonyl group-containing solvent is dimethylsulfoxide.

Examples of carboxyl group-containing solvents include formic acid, acetic acid, acrylic acid, methacrylic acid, oleic acid, linoleic acid, linolenic acid, lactic acid and caproic acid.

In Step (D), the surfaces of the modified metal oxide particles (iii) can be coated with a silane compound.

In this invention, an organic solvent sol of the above modified metal oxide particles (iii) and an organic resin-containing film-forming composition are obtained.

A film-forming composition can be obtained by the selection and admixture of, as the organic resin, a heat-curable or photocurable resin. Also, an amine-type curing agent, acid anhydride-type curing agent, radical generator-type curing agent (thermal radical generator, photoradical generator) or acid generator-type curing agent (thermal acid generator or photoacid generator) can be included and the composition rendered into a cured product.

A cured product can be formed by applying or filling the film-forming composition containing the organic resin and the curing agent onto a substrate and heating, light irradiation or a combination thereof. The organic resin (curable resin) is exemplified by resins having functional groups such as epoxy groups or (meth)acryloyl groups, and isocyanate-type resins. For example, a photocurable polyfunctional acrylate can be advantageously used.

Exemplary polyfunctional acrylates include polyfunctional acrylates having two, three, four or more functional groups on the molecule. Specific examples include neopentyl glycol di(meth)acrylate, trimethylolpropane tri(meth) acrylate, pentaerythritol tetra(meth)acrylate and dipentaerythritol hexa(meth)acrylate.

Further examples include the following polyfunctional acrylates as well.

[Chem. 4]

(b2-1)

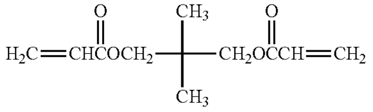

(b2-2)

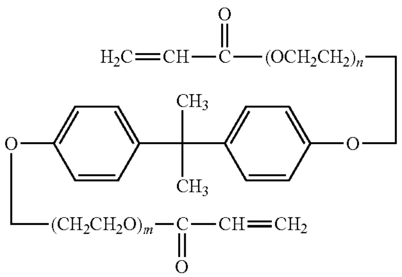

[Chem. 5]

(b2-3)

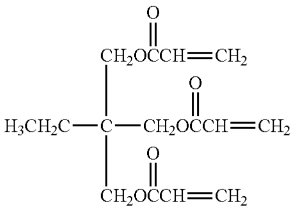

(b2-4)

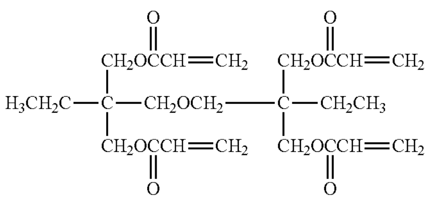

-continued

[Chem. 6]

(b2-5)

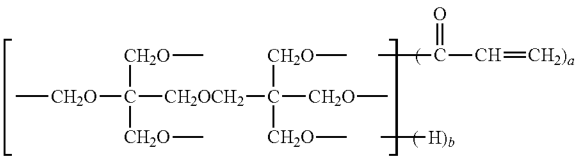

a = 5, b = 1 } mixtures of these
a = 6, b = 0

[Chem. 7]

(b2-6)

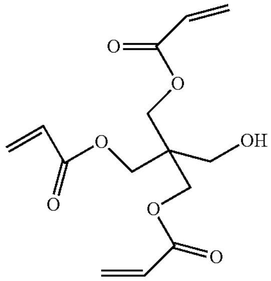

(b2-7)

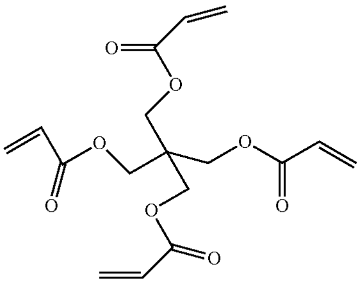

(b2-8)

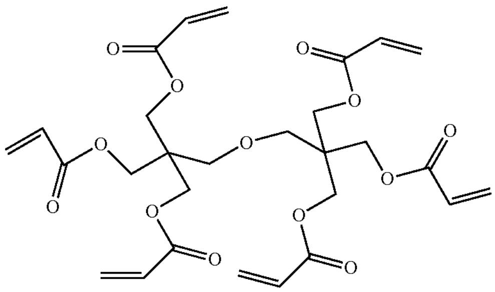

The film-forming composition of the invention may include a surfactant (leveling agent).

Anionic surfactants, cationic surfactants, amphoteric surfactants, nonionic surfactants and silicone-based surfactants can be used as the surfactant (leveling agent). The surfactant (leveling agent) may be added within a range of from 0.01 to 5 phr, or from 0.01 to 1 phr, with respect to the organic resin.

Anionic surfactants that may be used in the invention include sodium salts and potassium salts of fatty acids, alkylbenzenesulfonates, higher alcohol sulfates, polyoxyethylene alkyl ether sulfates, α-sulfo fatty acid esters, α-olefinsulfonates, monoalkylphosphates and alkanesulfonates.

Exemplary alkylbenzenesulfonates include the sodium, potassium and lithium salts, examples of which include sodium $C_{10-16}$ alkylbenzenesulfonates, $C_{10-16}$ alkylbenzenesulfonic acids and sodium alkylnaphthalenesulfonates.

Examples of higher alcohol sulfates include the following having 12 carbon atoms: sodium dodecyl sulfate (sodium lauryl sulfate), triethanolamine lauryl sulfate and triethanolammonium lauryl sulfate.

Examples of polyoxyethylene alkyl ether sulfates include sodium polyoxyethylene styrenated phenyl ether sulfate, ammonium polyoxyethylene styrenated phenyl ether sulfate, sodium polyoxyethylene decyl ether sulfate, ammonium polyoxyethylene decyl ether sulfate, sodium polyoxyethylene lauryl ether sulfate, ammonium polyoxyethylene lauryl ether sulfate, sodium polyoxyethylene tridecyl ether sulfate and sodium polyoxyethylene oleyl cetyl ether sulfate.

An example of an α-olefinsulfonate is sodium α-olefinsulfonate.

An example of an alkanesulfonate is sodium 2-ethylhexyl sulfate.

Cationic surfactants that may be used in the invention are exemplified by alkyltrimethylammonium salts, dialkyldimethylammonium salts, alkyldimethylbenzylammonium salts and amine salt type agents.

Alkyltrimethylammonium salts are quaternary ammonium salts having a chloride ion or bromide ion as the counterion. Examples include dodecyltrimethylammonium chloride, cetyltrimethylammonium chloride, cocoalkyltrimethylammonium chloride and $C_{16-18}$ alkyl trimethylammonium chloride.

Dialkyldimethylammonium salts are compounds having two lipophilic main chains and two methyl groups, as exemplified by bis(hydrogenated tallow) dimethylammonium chloride. Examples include didecyldimethylammonium chloride, dicocoalkyldimethylammonium chloride, dihydrogenated tallow alkyl dimethylammonium chloride and di-$C_{14-18}$ alkyl dimethylammonium chloride.

Alkyldimethylbenzylammonium salts are exemplified by benzalkonium chloride, which is a quaternary ammonium salt having one lipophilic main chain, two methyl groups and a benzyl group. Examples include $C_{8-18}$ alkyl dimethylbenzylammonium chlorides.

Exemplary amine salt type agents include compounds in which hydrogen atoms on ammonia are substituted with one or more hydrocarbon group, examples of which include N-methylbishydroxyethylamine fatty acid ester hydrochlorides.

Exemplary amphoteric surfactants that may be used in the invention include N-alkyl-β-alanine-type alkylamino fatty acid salts, alkylcarboxy betaine-type alkylbetaines and N,N-dimethyldodecylamine oxide-type alkylamine oxides. Examples of these include lauryl betaine, stearyl betaine, 2-alkyl-N-carboxymethyl-N-hydroxyethylimidazolinium betaine and lauryl dimethylamine oxide.

Exemplary nonionic surfactants that may be used in the invention include polyoxyethylene alkyl ethers, polyoxyethylene alkyl phenol ethers, alkyl glycosides, polyoxyethylene fatty acid esters, sucrose fatty acid esters, sorbitan fatty acid esters, polyoxyethylene sorbitan fatty acid esters and fatty acid alkanolamides. Examples of polyoxyethylene alkyl ethers include polyoxyethylene dodecyl ether (polyoxyethylene lauryl ether), polyoxyalkylene lauryl ether, polyoxyethylene tridecyl ether, polyoxyalkylene tridecyl ether, polyoxyethylene myristyl ether, polyoxyethylene cetyl ether, polyoxyethylene oleyl ether, polyoxyethylene stearyl ether, polyoxyethylene behenyl ether, polyoxyethylene-2-ethyl hexyl ether and polyoxyethylene isodecyl ether.

Examples of polyoxyethylene alkyl phenol ethers include polyoxyethylene styrenated phenyl ether, polyoxyethylene nonyl phenyl ether, polyoxyethylene distyrenated phenyl ether and polyoxyethylene tribenzyl phenyl ether.

Examples of alkyl glucosides include decyl glucoside and lauryl glucoside.

Examples of polyoxyethylene fatty acid esters include polyoxyethylene monolaurate, polyoxyethylene monostearate, polyoxyethylene monooleate, polyethylene glycol distearate, polyethylene glycol dioleate and polypropylene glycol dioleate.

Examples of sorbitan fatty acid esters include sorbitan monocaprylate, sorbitan monolaurate, sorbitan monomyristate, sorbitan monopalmitate, sorbitan monostearate, sorbitan distearate, sorbitan tristearate, sorbitan monooleate, sorbitan trioleate, sorbitan monosesquiolate and ethylene oxide adducts of these.

Examples of polyoxyethylene sorbitan fatty acid esters include polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate and polyoxyethylene sorbitan triisostearate.

Examples of fatty acid alkanolamides include coconut oil fatty acid diethanolamide, tallow fatty acid diethanolamide, lauric acid diethanolamide and oleic acid diethanolamide.

Additional examples include polyoxyalkyl ethers or polyoxyalkyl glycols such as polyoxyethylene polyoxypropylene glycol and polyoxyethylene fatty acid esters, polyoxyethylene hydrogenated castor oil ether, sorbitan fatty acid ester alkyl ethers, alkyl polyglucosides, sorbitan monooleate and sucrose fatty acid esters.

A silicone-type surfactant may be used. Silicone-type surfactants are compounds which have siloxane bond-containing recurring units on the main chain. Silicone-type surfactants having a weight-average molecular weight within the range of 500 to 50,000 may be used. These may be modified silicone-type surfactants and are exemplified by structures in which organic groups have been introduced onto the side chains and/or ends of a polysiloxane. Examples of the organic groups include amino, epoxy, alicyclic epoxy, carbinol, mercapto, carboxyl, aliphatic ester, aliphatic amide and polyether groups. Examples of silicone-type surfactants include those available under the trade names Toray Silicone DC3PA, Toray Silicone SH7PA, Toray Silicone DC11PA, Toray Silicone SH21PA, Toray Silicone SH28PA, Toray Silicone SH29PA, Toray Silicone SH30PA and Toray Silicone SH8400 (all available from Dow Corning Toray Co., Ltd.); Silwet 1-77, L-7280, L-7001, L-7002, L-7200, L-7210, L-7220, L-7230, L7500, L-7600, L-7602, L-7604, L-7605, L-7622, L-7657, L-8500 and L-8610 (all available from Momentive Performance Materials, Inc.); KP-341, KF-6001 and KF-6002 (available from Shin-Etsu Silicone); and BYK307, BYK323 and BYK330 (available from BYK-Chemie GmbH). For example, the product of the trade name L-7001 (DOWSIL) can be suitably used as a polyether-modified silicone.

In this invention, a film-forming composition containing the above-described organic solvent sol and an organic resin can be obtained. That is, a film-forming composition containing modified metal oxide particles (iii) and an organic resin can be obtained by removing the organic solvent within the organic solvent sol.

When the film-forming composition is a heat-curable film-forming composition, it is possible to add a heat-curing agent within a range of from 0.01 to 50 phr, or from 0.01 to 10 phr, with respect to the epoxy group, (meth)acryloyl group or other functional group-containing resin. For example, the heat-curing agent may be included in a ratio of 0.5 to 1.5 equivalents, preferably 0.8 to 1.2 equivalents, with respect to the functional groups such as epoxy groups or (meth)acryloyl groups. The equivalent weight of heat-curing agent with respect to the curable resin is indicated as the equivalent ratio of the heat-curable agent with respect to the functional groups.

Exemplary heat-curing agents include phenolic resins, amine-type curing agents, polyamide resins, imidazoles, polymercaptans, acid anhydrides, thermal radical generators and thermal acid generators. Radical generator-type curing agents, acid anhydride-type curing agents and amine-type curing agents are especially preferred.

Even when these heat-curing agents are solids, they may be used after dissolution in a solvent. However, with a decrease in the density of the cured product or pore formation due to evaporation of the solvent, decreases in the strength and water resistance of the cured product arise and so the curing agent itself is preferably one that is liquid at normal temperature and pressure.

Examples of phenolic resins include phenolic novolac resins and cresol novolac resins.

Examples of amine-type curing agents include piperidine, N,N-dimethylpiperazine, triethanoldiamine, 2,4,6-tris(dimethylaminomethyl)phenol, benzyldimethylamine, 2-(dimethylaminomethyl)phenol, diethylenetriamine, triethylenetetramine, tetraethylenepentamine, diethylaminopropylamine, N-aminoethylpiperazine, di(1-methyl-2-aminocyclohexyl)methane, menthenediamine, isophoronediamine, diaminodicyclohexylmethane, 1,3-diaminomethylcyclohexane, xylenediamine, m-phenylenediamine, diaminodiphenylmethane, diaminodiphenylsulfone, 3,3'-diethyl-4,4'-diaminodiphenylmethane and diethyltoluenediamine. Of these, preferred use can be made of those which are liquid: diethylenetriamine, triethylenetetramine, tetraethylenepentamine, diethylaminopropylamine, N-aminoethylpiperazine, di(1-methyl-2-aminocyclohexyl)methane, menthenediamine, isophoronediamine, diaminodicyclohexylmethane, 3,3'-diethyl-4,4'-diaminodiphenylmethane and diethyltoluenediamine.

Polyamide resins are formed by the condensation of a dimer acid and a polyamine. They are poly(amidoamines) having a primary amine and a secondary amine on the molecule.

Examples of imidazoles include 2-methylimidazole, 2-ethyl-4-methylimidazole, 1-cyanoethyl-2-undecylimidazolium trimellitate and epoxy-imidazole adducts.

Polymercaptans are compounds in which mercaptan groups are present at the ends of a polypropylene glycol chain or compounds in which mercaptan groups are present at the ends of a polyethylene glycol chain. Ones that are liquid are preferred.

The acid anhydride-type curing agents are preferably anhydrides of compounds having a plurality of carboxyl groups on the molecule. Examples of these acid anhydride-type curing agents include phthalic anhydride, trimellitic anhydride, pyromellitic anhydride, benzophenonetetracarboxylic anhydride, ethylene glycol bistrimellitate, glycerol tristrimellitate, maleic anhydride, tetrahydrophthalic anhydride, methyltetrahydrophthalic anhydride, endomethylenetetrahydrophthalic anhydride, methylendomethylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexenedicarboxylic anhydride and chlorendic anhydride.

Thermal acid generators are exemplified by sulfonium salts and phosphonium salts. Preferred use can be made of a sulfonium salt. Examples include the following compounds.

[Chem. 8]

(C-1)

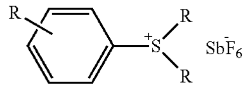

(C-2)

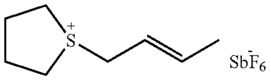

R is exemplified by alkyl groups of 1 to 12 carbon atoms and aryl groups of 6 to 20 carbon atoms. Alkyl groups of 1 to 12 carbon atoms are especially preferred.

Of these thermal acid generators, the following which are liquid at normal temperature and pressure are preferred: methyltetrahydrophthalic anhydride, methyl-5-norbornene-2,3-dicarboxylic anhydride (methylnadic anhydride, methylhimic anhydride), hydrogenated methylnadic anhydride, methylbutenyltetrahydrophthalic anhydride, dodecenylsuccinic anhydride, methylhexahydrophthalic anhydride, and mixtures of methylhexahydrophthalic anhydride and hexahydrophthalic anhydride. These liquid acid anhydrides have a viscosity, as measured at 25° C., of from about 10 to about 1,000 mPa·s.

Examples of thermal radical generators include 2,2'-azobis(isobutyronitrile), 2,2'-azobis(2-methylbutyronitrile), 2,2'-azobis(2,4-dimethylvaleronitrile), 4,4'-azobis(4-cyanovaleric acid), dimethyl 2,2'-azobis(2-methylpropionate), 2,2'-azobis(2-methylpropionamidine) dihydrochloride, 2,2'-azobis [2-(2-imidazolin-2-yl)propane] dihydrochloride, tert-butyl hydroperoxide, cumene hydroperoxide, di-tert-butyl peroxide, dicumyl peroxide and benzoyl peroxide. These can be acquired from Tokyo Chemical Industry Co., Ltd.

When obtaining the cured product, a curing aid may be concomitantly used. Examples of the curing aid include organic phosphorus compounds such as triphenylphosphine and tributylphosphine, quaternary phosphonium salts such as ethyltriphenylphosphonium bromide and diethyl methyltriphenylphosphonium phosphate, and quaternary ammonium salts such as 1,8-diazabicyclo(5,4,0)undec-7-ene, the octanoic acid salt of 1,8-diazabicyclo(5,4,0)undec-7-ene, zinc octanoate, and tetrabutylammonium bromide. These curing aids may be included in an amount of from 0.001 to 0.1 part by weight per part by weight of the curing agent.

A heat-curable varnish can be obtained as the composition by mixing together the resin, the curing agent and, optionally, a curing aid. The mixture of these may be carried out using an agitating blade or a kneader within a reactor. Mixture is carried out by mixing under applied heat at a temperature of between 60° C. and 100° C. for a period of from 0.5 to 1 hour.

The resulting curable film-forming composition is a heat-curable coating composition and has a suitable viscosity for use as, for example, a liquid encapsulant. The liquid heat-curable film-forming composition may be prepared to any viscosity and, for use as a clear encapsulant for LEDs and the like by a casting, potting, dispenser or printing method, can be locally sealed at the desired location. The liquid heat-curable composition is directly applied in liquid form onto the LED or the like by the above method, after which it is dried and cured to give an epoxy resin cured body.

The heat-curable film-forming composition (heat-curable coating composition) is applied onto a substrate and heated at a temperature of between 80° C. and 200° C., thereby giving a cured composition.

In cases where the above film-forming composition is a photocurable resin composition, a photocuring agent (photoradical generator, photoacid generator) may be added within a range of from 0.01 to 50 phr, or from 0.01 to 10 phr, to a resin containing functional groups such as epoxy groups or (meth)acryloyl groups. For example, the photocuring agent (photoradical generator, photoacid generator) may be included in an amount of from 0.5 to 1.5 equivalents, preferably from 0.8 to 1.2 equivalents, with respect to the functional groups such as epoxy groups or (meth)acryloyl groups. The equivalent weight of the photocuring agent with respect to the curable resin is indicated as the equivalent ratio of the photocuring agent with respect to the functional groups.

The photoradical generator is not particularly limited, provided that it is a compound which directly or indirectly generates a radical upon exposure to light.

The photoradical generator is exemplified by, as photoradical polymerization initiators: imidazole compounds, diazo compounds, bisimidazole compounds, N-arylglycine compounds, organic azide compounds, titanocene compounds, aluminate compounds, organic peroxides, N-alkoxypyridinium salt compounds and thioxanthone compounds. Examples of azide compounds include p-azidobenzaldehyde, p-azidoaceophenone, p-azidobenzoic acid, p-adizobenzalacetophenone, 4,4'-diazidochalcone, 4,4'-diazidodiphenylsulfide and 2,6-bis(4'-azidobenzal)-4-methylcyclohoexanone. Examples of diazo compounds include 1-diazo-2,5-diethoxy-4-p-tolylmercaptobenzene borofluoride, 1-diazo-4-N,N-dimethylaminobenzene chloride and 1-diazo-4-N,N-diethylaminobenzene borofluoride. Examples of bisimidazole compounds include 2,2'-bis(o-chlorophenyl)-4,5,4',5'-tetrakis(3,4,5-trimethoxyphenyl)-1,2'-bisimidazole and 2,2'-bis(o-chlorophenyl)-4,5,4',5'-tetraphenyl-1,2'-bisimidazole. Examples of titanocene compounds include dicyclopentadienyltitanium dichloride, dicyclopentadienyltitanium-bisphenyl, dicyclopentadienyltitanium-bis(2,3,4,5,6-pentafluorophenyl), dicyclopentadienyltitanium-bis(2,3,5,6-tetrafluorophenyl), dicyclopentadienyltitanium-bis(2,4,6-trifluorophenyl), dicyclopentadienyltitanium-bis(2,6-difluorophenyl), dicyclopentadienyltitanium-bis(2,4-difluorophenyl), bis(methylcyclopentadienyl) titanium-bis(2,3,4,5,6-pentafluorophenyl), bis(methylcyclopentadienyl) titanium-bis(2,3,5,6-tetrafluorophenyl), bis(methylcyclopentadienyl) titanium-bis(2,6-difluorophenyl) and dicyclopentadienyltitanium-bis(2,6-difluoro-3-(1H-pyrrol-1-yl)phenyl).

Examples of photoradical generators include 1,3-di(tert-butyldioxycarbonyl)benzophenone, 3,3',4,4'-tetrakis(tert-butyldioxycarbonyl)benzophenone, 3-phenyl-5-isooxazolone, 2-mercaptobenzimidazole, 2,2-dimethoxy-1,2-diphenylethan-1-one, 1-hydroxycyclohexyl phenyl ketone and 2-benzyl-2-dimethylamino-1-(4-morpholinophenyl) butanone.

These photoradical polymerization initiators can be acquired as, for example, Irgacure TPO (2,4,6-trimethylbenzoyl diphenyl phosphine oxide), available under this trade name from BASF (c1-1-1), Omnirad 819 (bis(2,4,6-trimethylbenzoyl)phenyl phosphine oxide), available under this trade name from IGM RESINS (c1-1-2), or Irgacure 184 (1-hydroxycyclohexy]phenyl ketone), available under this trade name from IGM RESINS (c1-1-3).

[Chem. 9]

(c1-1-1)

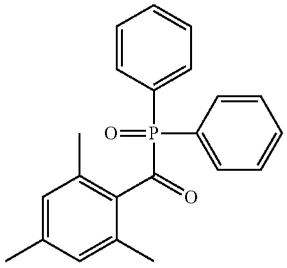

(c1-1-2)

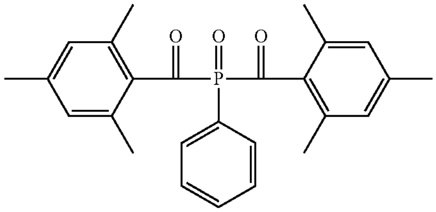

(c1-1-3)

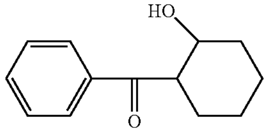

The photoacid generator is not particularly limited, provided that it is one which directly or indirectly generates an acid upon exposure to light. Exemplary photoacid generators include triazine compounds, acetophenone derivative compounds, disulfone compounds, diazomethane compounds, sulfone derivative compounds, onium salts such as iodonium salts, sulfonium salts, phosphonium salts and selenium salts, metallocene complexes and iron-arene complexes.

Examples of onium salts that may be used as the photoacid generator include the following iodonium salts: bis(alkylphenyl)iodonium salts such as diphenyliodonium chloride, diphenyliodonium trifluoromethane sulfoxide, diphenyliodonium mesylate, diphenyliodonium tosylate, diphenyliodonium bromide, diphenyliodonium tetrafluoroborate, diphenyliodonium hexafluoroantimonate, diphenyliodonium hexafluoroarsenate, bis(p-tert-butylphenyl)iodonium hexafluorophosphate, bis(p-tert-butylphenyl) iodonium mesylate, bis(p-tert-butylphenyl)iodonium tosylate, bis(p-tert-butylphenyl)iodonium trifluoromethane sulfonate, bis(p-tert-butylphenyl)iodonium tetrafluoroborate, bis(p-tert-butylphenyl)iodonium chloride, bis(p-chlorophenyl)iodonium chloride, bis(p-chlorophenyl)iodonium tetrafluoroborate and bis(4-t-butylphenyl)iodonium hexafluorophosphate; alkoxycarbonylalkoxy trialkylaryl iodonium salts (e.g., 4-[(1-ethoxycarbonylethoxy)phenyl]-(2,4,6-trimethylphenyl)iodonium hexafluorophosphate), and bis(alkoxyaryl)iodonium salts (e.g., bis(alkoxyphenyl)iodonium salts such as 4-methoxyphenyl)phenyl iodonium hexafluoroantimonate).

Examples of sulfonium salts include triphenylsulfonium salts such as triphenylsulfonium chloride, triphenylsulfonium bromide, tri(p-methoxyphenyl)sulfonium tetrafluoroborate, tri(p-methoxyphenyl)sulfonium hexafluorophosphonate, tri(p-ethoxyphenyl)sulfonium tetrafluoroborate, triphenylsulfonium triflate, triphenylsulfonium hexafluoroantimonate and triphenylsulfonium hexafluorophosphate; and sulfonium salts such as (4-phenylthiophenyl)diphenylsulfonium hexafluoroantimonate, (4-phenylthiophenyl)

diphenylsulfonium hexafluorophosphate, bis [4-(diphenylsulfonio)phenyl]sulfide bishexafluoroantimonate, bis [4-(diphenylsulfonio)phenyl]sulfide bishexafluorophosphate and (4-methoxyphenyl)diphenylsulfonium hexafluoroantimonate).

Examples of phosphonium salts include triphenylphosphonium chloride, triphenylphosphonium bromide, tri(p-methoxyphenyl)phosphonium tetrafluoroborate, tri(p-methoxyphenyl)phosphonium hexafluorophosphonate, tri(p-ethoxyphenyl)phosphonium tetrafluoroborate, 4-chlorobenzenediazonium hexafluorophosphate and benzyltriphenylphosphonium hexafluoroantimonate.

Additional examples include selenium salts such as triphenylselenium hexafluorophosphate, and metallocene complexes such as (η5- or η6-isopropylbenzene) (η5-cyclopentadienyl)iron(II) hexafluorophosphate.

The following compounds can also be used as photoacid generators.

[Chem. 10]

(A-1)

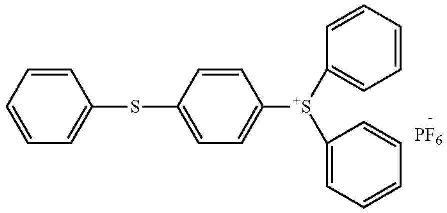

(A-2)

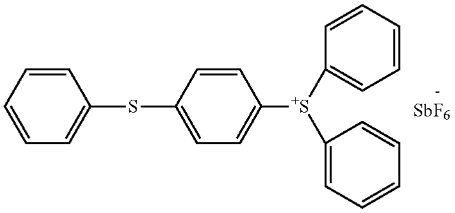

(A-3)

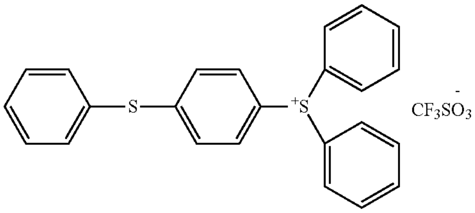

(A-4)

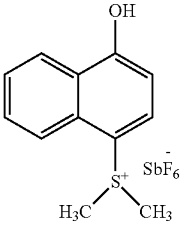

(A-5)

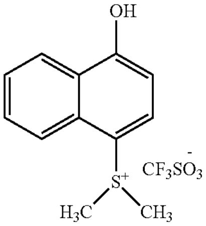

-continued (A-6)

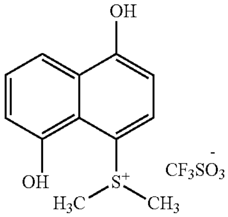

(A-7)

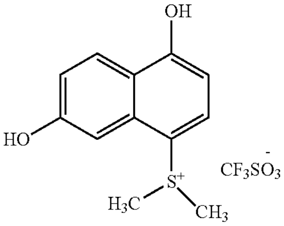

[Chem. 11]

(A-8)

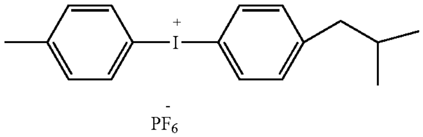

(A-9)

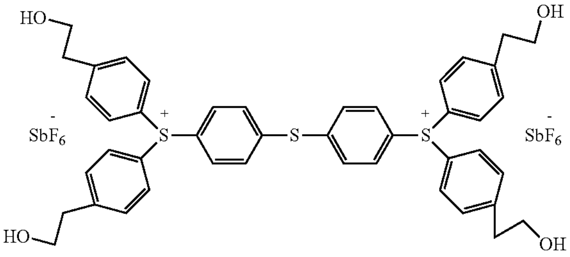

(A-10)

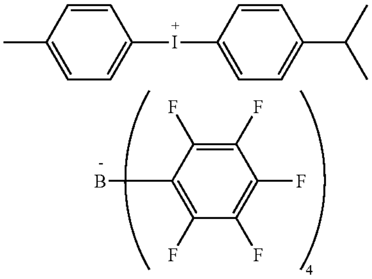

[Chem. 12]

(B-1)

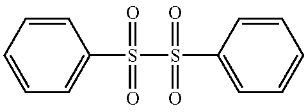

(B-2)

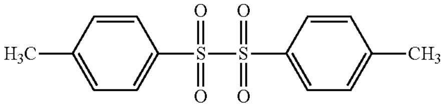

(B-3)

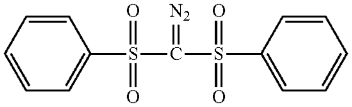

-continued
(B-4)
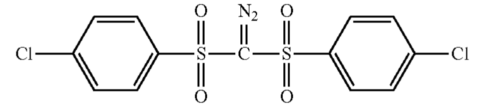
(B-5)
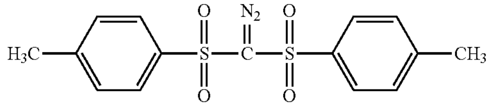
(B-6)
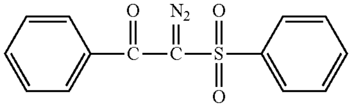
(B-7)
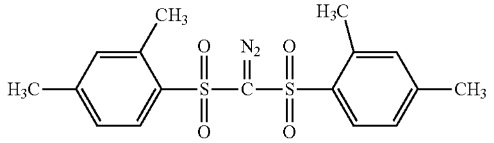
(B-8)
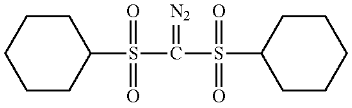
(B-9)
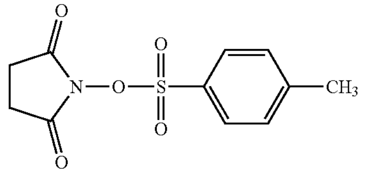
(B-10)
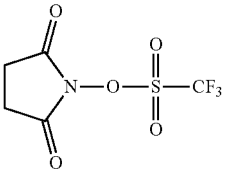
(B-11)
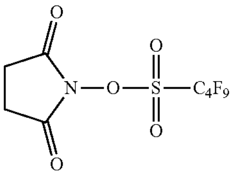
(B-12)
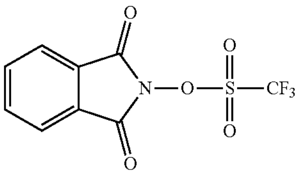
[Chem. 13]
(B-13)
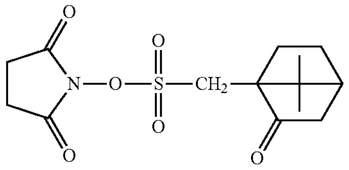
-continued
(B-14)
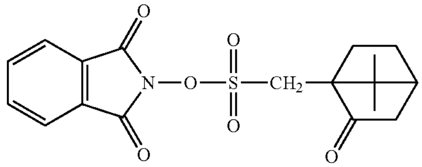
(B-15)
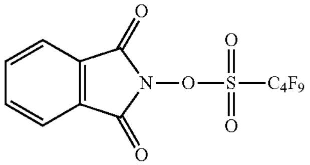
(B-16)
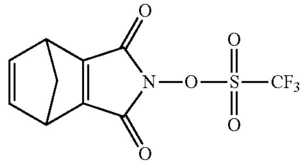
(B-17)
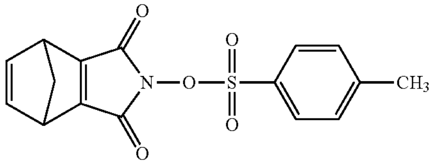
(B-18)
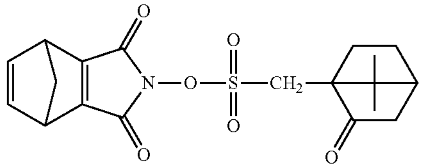
(B-19)
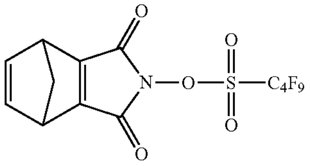
[Chem. 14]
(B-20)
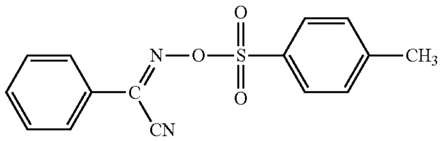
(B-21)
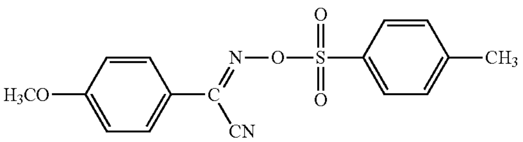
(B-22)
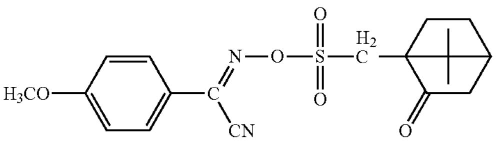

-continued
(B-23)
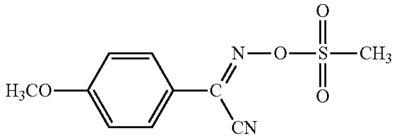
(B-24)
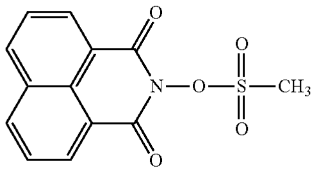
(B-25)
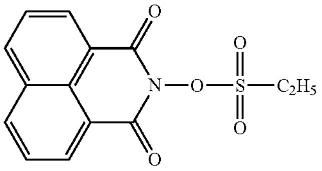
(B-26)
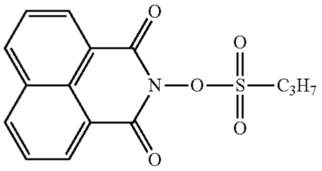
(B-27)
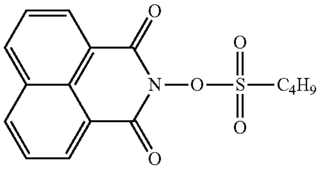
(B-28)
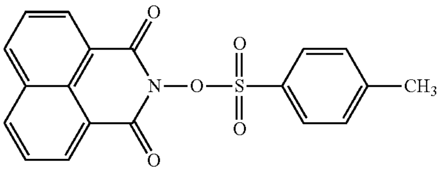
(B-29)
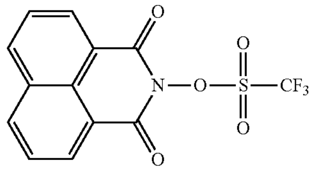
[Chem. 15]
(B-30)
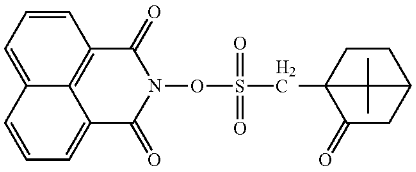
(B-31)
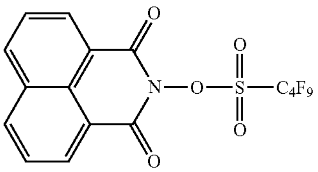
-continued
(B-32)
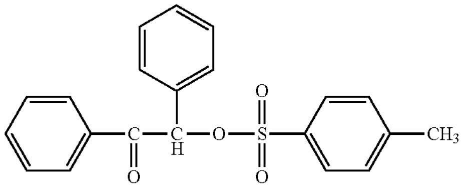
(B-33)
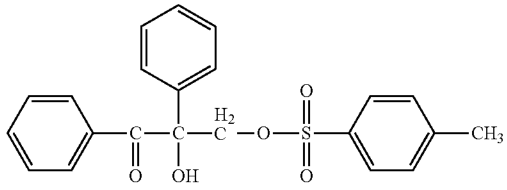
(B-34)
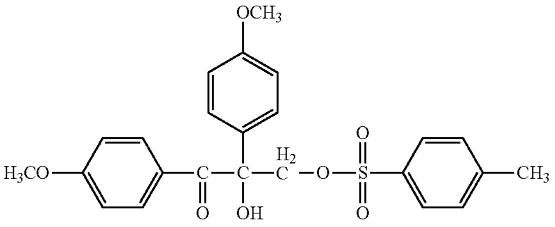
(B-35)
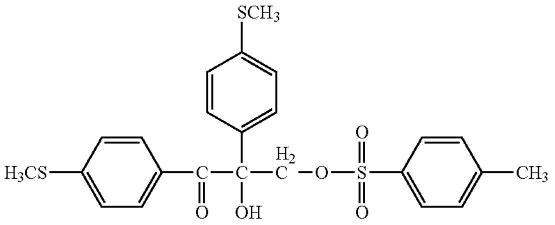
[Chem. 16]
(B-36)
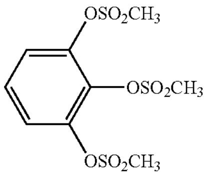
(B-37)
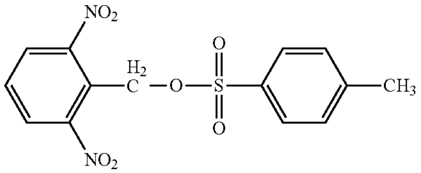
(B-38)
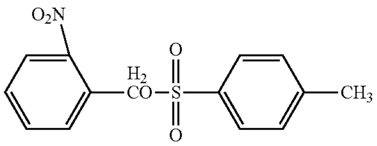

-continued
(B-39)
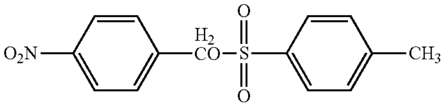
(B-40)
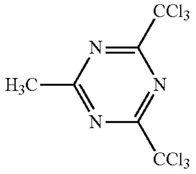
(B-41)
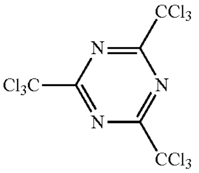
(B-42)
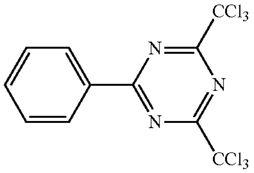
(B-43)
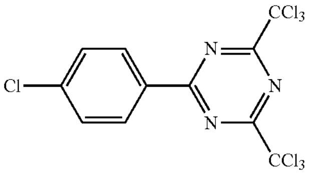
(B-44)
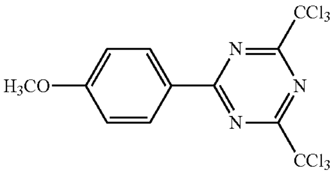
(B-45)
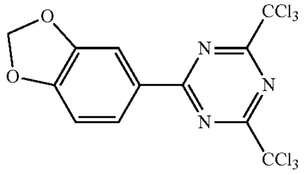
(B-46)
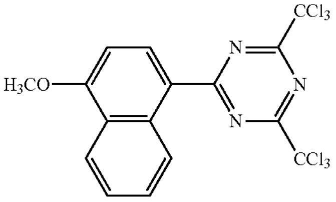
(B-47)
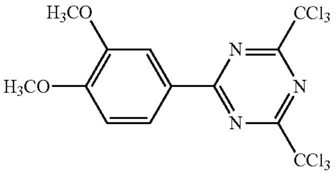
-continued
[Chem. 17]
(B-48)
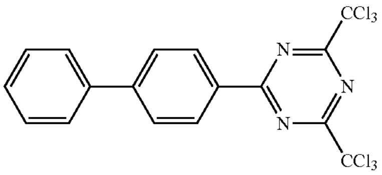
(B-49)
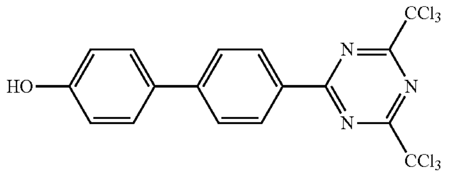
(B-50)
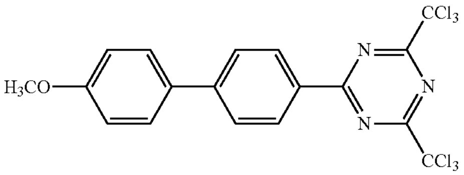
(B-51)
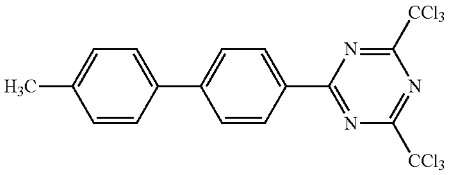
[Chem. 18]
(B-52)
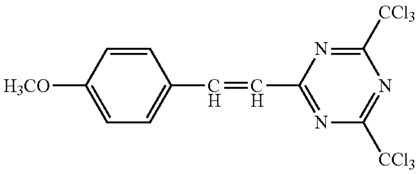
(B-53)
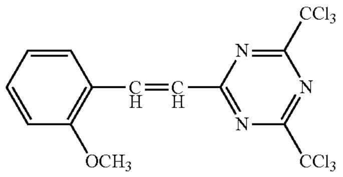
(B-54)
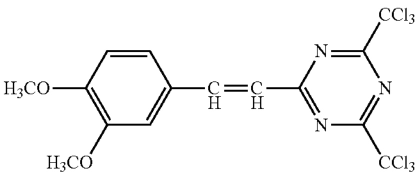
(B-55)
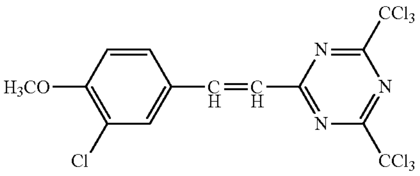

-continued (B-56)

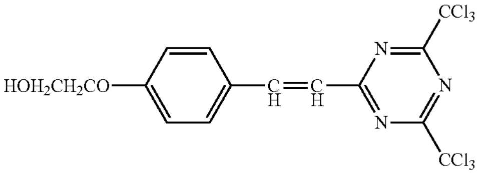

(B-57)

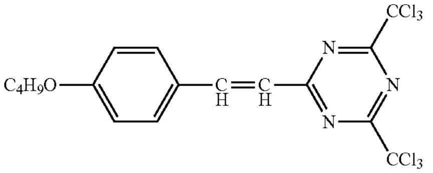

Sulfonium salt compounds and iodonium salt compounds are preferred as the photoacid generator. Examples of the anionic species of these include $CF_3SO_3^-$, $C_4F_9SO_3^-$, $C_8F_{17}SO_3^-$, the camphorsulfonic anion, the toluenesulfonic ion, $BF_4^-$, $PF_6^-$, $AsF_6^-$ and $SbF_6^-$. The anionic species of, for example, phosphorus hexafluoride and antimony hexafluoride which exhibit strong acidity are especially preferred.

The film-forming composition of the invention may optionally include conventional additives. Examples of such additives include pigments, colorants, thickeners, sensitizers, foam inhibitors, coatability enhancers, lubricants, stabilizers (antioxidants, heat stabilizers, light stabilizers), plasticizers, dissolution promoters, fillers and antistatic agents. One of these additives may be used alone or two or more may be used in combination.

Methods for applying the film-forming composition of the invention include flow coating, spin coating, spray coating, screen printing, casting, bar coating, curtain coating, roll coating, gravure coating, dipping and slit die coating.

In the invention, the optical coating composition (film-forming composition) can be applied onto a substrate and cured by light irradiation. Heating may be carried out before and after light irradiation.

The film thickness may be selected in accordance with the intended use of the cured product within a range of from about 0.01 μm to about 10 mm. For example, when the film is used as a photoresist, the thickness may be set to from about 0.05 μm to about 10 μm (especially from about 0.1 to about 5 μm); when the film is used in a printed circuit board, the thickness may be set to from about 5 μm to about 5 μm (especially from about 100 μm to about 1 mm); and when the film is used as an optical thin-film, the thickness may be set to from about 0.1 μm to about 100 μm (especially from about 0.3 to about 50 μm).

When a clear film is to be obtained, the visible light transmittance of the film may be set to 80% or more, to 90% or more, or typically to from 90 to 96%.

The light employed for irradiation or exposure when a photoacid generator is used may be, for example, gamma rays, x-rays, ultraviolet light, visible light, etc., although in general visible light or UV light, and especially UV light, is often used. The wavelength of the light is, for example, from about 150 nm to about 800 nm, preferably from about 150 nm to about 600 nm, and more preferably from about 150 nm to about 400 nm. The irradiation dose varies with the thickness of the film, but may be set to, for example, from about 2 $mJ/cm^2$ to about 20,000 $mJ/cm^2$, and preferably from about 5 $mJ/cm^2$ to about 5,000 $mJ/cm^2$. The light source may be selected according to the type of light used for exposure. In the case of UV light, use can be made of, for example, a low-pressure mercury vapor lamp, a high-pressure mercury vapor lamp, an ultrahigh-pressure mercury vapor lamp, a deuterium lamp, a halogen lamp or a laser light (e.g., helium-cadmium laser, excimer laser). Curing reactions in the composition proceed with such light irradiation.

In cases where a thermal acid generator is used, the heating of the film carried out, where necessary, following light irradiation using a photoacid generator is carried out at between about 60° C. and about 350° C., preferably between about 100° C. and about 300° C. The heating time can be selected from a range of 3 seconds and above (e.g., from about 3 seconds to about 5 hours). For example, heating can be carried out for a period of from about 5 seconds to about 2 hours, preferably from about 20 seconds to about 30 minutes, and is generally carried out for a period of from about 1 minute to about 3 hours (e.g., from about 5 minutes to about 2.5 hours).

In addition, when forming a pattern or image (e.g., when producing a printed circuit board or the like), the film formed on a substrate may be pattern exposed, and this pattern exposure may be carried out by scanning laser light or may be carried out by light irradiation through a photomask. A pattern or image can be formed by developing (or dissolving) the nonirradiated regions (unexposed areas) created by such pattern exposure with a developer.

An alkaline aqueous solution or an organic solvent may be used as the developer.

Examples of alkaline aqueous solutions include aqueous solutions of alkalimetal hydroxides such as potassium hydroxide, sodium hydroxide, potassium carbonate and sodium carbonate; aqueous solutions of quaternary ammonium hydroxides such as tetramethylammonium hydroxide, tetraethylammonium hydroxide and choline; and aqueous solutions of amines such as ethanolamine, propylamine and ethylenediamine.

The above alkaline developer is generally a 10 wt % or lower aqueous solution; preferred use can be made of a 0.1 to 3.0 wt % aqueous solution. Alcohols and surfactants may be added and used in the developer, the amounts of these each being preferably from 0.05 to 10 parts by weight per 100 parts by weight of the developer.

Of these, a 0.1 to 2.38 wt % aqueous solution of tetramethylammonium hydroxide can be used.

A common organic solvent may be used as the organic solvent in the developer. Examples include acetone, acetonitrile, toluene, dimethylformamide, methanol, ethanol, isopropanol, propylene glycol methyl ether, propylene glycol ethyl ether, propylene glycol propyl ether, propylene glycol butyl ether, propylene glycol methyl ether acetate, propylene glycol ethyl ether acetate, propylene glycol propyl ether acetate, propylene glycol butyl ether acetate, ethyl lactate and cyclohexanone. These may be used singly or as mixtures of two or more. The use of, for example, propylene glycol methyl ether, propylene glycol methyl ether acetate or ethyl lactate is especially preferred.

In the invention, an adhesion promoter may be added for the purpose of enhancing adhesion with the substrate following development. Examples of the adhesion promoter include chlorosilanes such as trimethylchlorosilane, dimethylvinylchlorosilane, methyldiphenylchlorosilane and chloromethyldimethylchlorosilane; alkoxysilanes such as trimethylmethoxysilane, dimethyldiethoxysilane, methyldimethoxysilane, dimethylvinylethoxysilane, diphenyldimethoxysilane and phenyltriethoxysilane; silazanes such as hexamethyldisilazane, N,N'-bis(trimethylsilyl)urea, dimethyltrimethylsilylamine and trimethylsilylimidazole; silanes such as vinyltrichlorosilane, 3-chloropropyltrimethoxysilane, 3-aminopropyltriethoxysilane, 3-methacryloxypropyltrimethoxysilane, 3-glycidoxypropyltrimethoxysilane and 3-(N-piperidinyl) propyltrimethoxysilane; heterocyclic compounds such as benzotriazole, benzimidazole, indazole, imidazole, 2-mercaptobenzimidazole, 2-mercaptobenzothiazole, 2-mercaptobenzoxazole, urazole, thiouracil, mercaptoimidazole and mercaptopyrimidine; ureas such as 1,1-dimethylurea and 1,3-dimethylurea; and thiourea compounds. One such adhesion promoter may be used alone or two or more may be used in combination. These adhesion promoters are added in an amount which accounts for generally 18 wt % or less, preferably from 0.0008 to 9 wt %, and more preferably from 0.04 to 9 wt %, of the solids.

In this invention, a sensitizer may be included. Examples of sensitizers that can be used include anthracene, phenothiazine, perylene, thioxanthone and benzophenonethioxanthone. In addition, examples of sensitizing dyes include thiopyrylium salt dyes, merocyanine dyes, quinoline dyes, styrylquinoline dyes, ketocoumarin dyes, thioxanthene dyes, xanthene dyes, oxonol dyes, cyanine dyes, rhodamine dyes and pyrylium dyes. Anthracene sensitizers are especially preferred; when used together with a cationic curing catalyst (radiation-sensitive cationic polymerization initiator), the sensitivity dramatically rises, along with which it has a radical polymerization initiating function. A catalyst species can be simply obtained with a hybrid system that jointly uses the cation curing system and radical curing system of the invention. Specific anthracene compounds that are effective include dibutoxyanthracene and dipropoxyanthraquinone. The sensitizer is used in an amount, based on the solids content, of from 0.01 to 20 wt %, and preferably from 0.01 to 10 wt %.

It is possible to photocure or heat-cure the composition of the invention by using a photoradical generator, a thermal radical generator, a photoacid generator or a thermal acid generator. In cases where a photoacid generator or a thermal acid generator is used, because commonly used epoxy curing agents (e.g., amines and acid anhydrides) are not used or the content thereof is exceedingly low even if they are used, the composition has a better storage stability.

We have found that the above composition is photocation-polymerizable. It has a higher cure rate than conventional liquid epoxy compounds (e.g., alicyclic epoxy compounds having an epoxycyclohexyl ring). Because the cure rate is rapid, it is possible to reduce the amount of acid generator added or to use a weak acid-type acid generator. Reducing the amount of acid generator is important for preventing metal corrosion because acidic active species sometimes remain present even after UV irradiation. Also, because the cure rate is rapid, thick-film curing is possible.

Curing with UV irradiation can be applied to heat-sensitive materials (substrates).

In this invention, an antistatic composition can be prepared by including modified metal oxide particles (iii) in the above modified metal oxide sol.

Also, in this invention, it is possible to produce an electron transport material-forming composition that contains modified metal oxide particles (iii) within the above modified metal oxide sol.

When a coating agent containing 300 phr of modified metal oxide particles (iii) from the above modified metal oxide sol with respect to a resin varnish serving as the binder ingredient is applied to a substrate in such a way as to result in a film thickness after drying of 1.0 μm, the film exhibits a surface resistivity, with the application of a voltage of 1,000 V, of from 10 to 500 G Ω/□.

EXAMPLES

The properties of the sols (dispersions) were determined by the following measurement methods.

[Average Primary Particle Size]

The particles were imaged using a transmission electron microscope (JEM-F200, from JEOL, Ltd.) and the average value of the circle-equivalent primary particle sizes for 500 random particles was treated as the average primary particle size.

[Average Particle Size by Dynamic Light Scattering (Dynamic Light Scattering Particle Size)]

The sol was diluted with a dispersing solvent and, using the solubility parameter of the solvent, measurement was carried out with a dynamic light scattering system (Zetasizer, from Malvern Instruments, Ltd.).

[Stability]

The dispersion was stored at 50° C. for one week, following which samples having a dynamic light scattering (DLS) particle size which is less than 1.2 times that prior to the shelf test were rated as "○" for the relative lack of change; samples for which the dynamic light scattering (DLS) particle size changed to 1.2 times or more compared with before the shelf test were rated as "x."

[Measurement of Amount of Amine]

The amount of amine within the sols obtained in the Examples of the invention and the Comparative Examples was measured as described in 1) to 3) below.

1) Preparation of Standard Samples for Working Curve

Standard samples of isopropylamine and diisopropylamine were prepared by diluting isopropylamine and diisopropylamine to concentrations of 10 ppm, 100 ppm and 1,000 ppm with 3 mM nitric acid.

Standard samples of tri-n-pentylamine were prepared by diluting tri-n-pentylamine to concentrations of 100 ppm, 1.00 ppm and 1 wt % with 3 mM nitric acid containing 20 wt % acetonitrile.

2) Preparation of Samples for Determining Amount of Amine in Sols Obtained in Examples and Comparative Examples The sols obtained in the Examples of the invention and the Comparative Examples were diluted with pure water to a colloidal particle concentration of 3 wt %. Next, 0.2 mL of 1 M nitric acid was added to 8.5 g of the diluted sol, following which the sol was left at rest 24 hours at room temperature, thereby stripping adsorbed amine from the particle surfaces.

The resulting solution was then centrifugally separated using a centrifugal ultrafiltration unit having a molecular weight cutoff of 10,000 Da and the filtrate was recovered. The recovered filtrate was diluted 10-fold with pure water, thereby preparing samples for determining the amount of amine within the sols obtained in the Examples of the invention and the Comparative Examples.

3) Calculating Amount of Amine in Sols Obtained in Examples and Comparative Examples The samples prepared in 1) and 2) above were measured using an ion chromatograph (Metrohm Compact IC 761, from Metrohm Japan K.K.). Working curves were created by plotting the peak integrated intensities of the isopropylamine, diisopropylamine and tri-n-pentylamine standard samples prepared in 1) against the respective amine concentrations. The amounts of amine included in the samples prepared in 2) were computed using the working curves.

[Measurement of Degree of Crystallization]

The degree of crystallization of the modified metal oxide particles within the sols obtained in the Examples and the Comparative Examples was measured as described in 1) to 3) below.

1) X-Ray Diffraction Measurement of Modified Metal Oxide Particles in Sols Obtained in Examples and Comparative Examples The sols of dispersed modified metal oxide particles obtained in the Examples were vacuum dried at 60° C. for 1 hour. The resulting dry powder was placed in a mortar and crushed with a pestle. The crushed particles were mixed with tungsten powder (available from FUJIFILM Wako Pure Chemical Corporation; ≥99.9 wt % tungsten) in a 50:50 weight ratio. The x-ray diffraction pattern for the mixed powder was measured using an x-ray diffractometer (MiniFlex 600, from Rigaku Corporation).

2) X-Ray Diffraction Measurement of Tin (IV) Oxide Standard Sample

Tin (IV) oxide powder (available from Kanto Chemical Co., Inc.; ≥99.0 wt % $SnO_2$) and tungsten powder (available from FUJIFILM Wako Pure Chemical Corporation; ≥99.9 wt % tungsten) were mixed together in a 50:50 weight ratio. The x-ray diffraction pattern for the mixed powder was measured using an x-ray diffractometer (MiniFlex 600, from Rigaku Corporation).

3) Calculation of Degree of Crystallization

The sum $A_{S1}$ of the (110), (101), (200), (211) and (220) peak integrated intensities for the tin (IV) oxide contained in the modified metal oxide particles measured in 1) above and the tungsten (110) peak integrated intensity $A_{W1}$ were calculated. Next, the sum $A_{S2}$ of the (110), (101), (200), (211) and (220) peak integrated intensities for the tin (IV) oxide and the (110) peak integrated intensity $A_{W2}$ for the tungsten measured in 2) above were calculated. The degree of crystallization of the modified metal oxide particles obtained in the Examples and Comparative Examples were calculated from the following formula.

$$\text{Degree of crystallization} = (A_{S1}/A_{W1})/(A_{S2}/A_{W2})$$

[Measurement of Refractive Index]

The refractive index of the modified metal oxide in the sols obtained in the Examples and the Comparative Examples was measured as described in 1) to 3) below.

1) Preparation of Varnish Containing Methanol-Dispersed Sol of Modified Metal Oxide 3-Glycidoxypropyltrimethoxysilane (SILQUEST A-187T, from Momentive) was weighed out in an amount of 20.00 g into a polyethylene container, 18.57 g of methanol and 4.57 g of a 0.01N aqueous solution of hydrochloric acid were added thereto, and the mixture was stirred at room temperature for 5 hours. Next, 6.00 g of an already prepared methanol solution of aluminum 2,4-pentanedionate (Al $(acac)_3$) was added as a curing agent and 10 minutes of stirring was carried out, giving a partial hydrolyzate of 3-glycidoxypropyltrimethoxysilane (concentration, 43 wt %).

The partial hydrolyzate of 3-glycidoxypropyltrimethoxysilane thus prepared, the dispersed sol of modified metal oxide, water, methanol and 0.25 g of a 10 wt % solution of leveling agent (L-7604, from DOWSIL) in methanol were weighed out into an amber-colored bottle to a total volume of 25.00 g, a weight ratio in the final solvent composition (expressed as "water/(sum of solvents other than water)") =1/4, and modified metal oxide contents in the methanol-dispersed sol of 50 phr, 100 phr and 150 phr, and the mixture was stirred for 30 minutes at room temperature, giving varnishes containing methanol-dispersed sols of modified metal oxide (solids concentration, 10.0 wt %; modified metal oxide contents, 50 phr, 100 phr, 150 phr).

2) Preparation of Particle-Containing Film

About 0.5 mL of the modified metal oxide methanol-dispersed sol-containing varnishes obtained in 1) were deposited as drops on UV—$O_3$ treated silicon substrates and applied thereto with a spin coater (Opticoat MS-B100, from Mikasa Co., Ltd.) to a film thickness following application of 1.0 μm. The varnish was then baked on a hot plate at 80° C. for 5 minutes and subsequently heat-treated in an oven at 120° C. for one hour, giving a particle-containing film (particle contents: 50 phr, 100 phr, 150 phr).

3) Measurement of Refractive Index of Particle-Containing Film, Calculation of Particle Refractive Index The refractive indices of the particle-containing films obtained in 2) (particle contents: 50 phr, 100 phr, 150 phr) were measured with an ellipsometer (VASE multiple incident angle spectroscopic ellipsometer, from JA Woollam Japan). Separately, the refractive index of a non-particle-containing film produced in the same way using only the partial hydrolyzate of 3-glycidoxypropyltrimethoxysilane was also measured. The refractive indices of the particle-containing films thus measured were plotted against the particle contents, and the refractive index of the particles was determined by extrapolating the plot to a particle content of 100 wt %.

[Measurement of Resistivity]

The resistivity of the particle-containing films obtained in the Examples and Comparative Examples was measured as described in 1) to 3) below.

1) Preparation of Varnishes Containing Dispersed Sols of Modified Metal Oxide

3-Glycidoxypropyltrimethoxysilane (SILQUEST A-187T, from Momentive) was weighed out in an amount of 37.50 g into a polyethylene container, 8.57 g of an aqueous 0.01N solution of hydrochloric acid was added thereto and the mixture was stirred at room temperature for 24 hours. Next, 4.61 g of the resulting solution was weighed out into a polyethylene container, 0.23 g of aluminum 2,4-pentanedionate ($Al(acac)_3$) was added as a curing agent and 0.50 g of a 10 wt % solution of leveling agent (L-7604, from DOWSIL) in methanol was also added. The dispersed sols of modified metal oxide obtained in the Examples and Comparative Examples, water and methanol were then added to a weight ratio in the final solvent composition (expressed as "water/(sum of solvents other than water)") of ¼ and a modified metal oxide content of 300 phr, and the mixture was stirred at room temperature for 24 hours, giving a varnish containing a dispersed sol of modified metal oxide (solids concentration, 15.0 wt %; modified metal oxide content, 300 phr).

2) Preparation of Particle-Containing Film

About 1 mL of the modified metal oxide dispersed sol-containing varnish obtained in 1) was deposited as drops on a UV—$O_3$ treated silicon substrate and applied thereto with a spin coater (PM-9050MC, from MST K.K.) to a film thickness following application of 1.0 μm. The varnish was then baked on a hot plate for 15 minutes at 80° C. and subsequently heat-treated for 2 hours in an oven at 120° C., giving a particle-containing film.

3) Resistivity Measurement of Particle-Containing Film

The surface resistivity of the particle-containing film (particle content, 300 phr) obtained in 2) was measured with a resistivity meter (Hiresta-UP MCP-HT450, from Mitsubishi Chemical KK) under the following conditions: voltage, 1,000 V; time, 10 seconds. The units are indicated in Ω/□ (ohms per square).

[Qualitative and Quantitative Determination of Stannic Oxide and Other Metal Oxides]

Qualitative and quantitative determinations of the stannic oxide and other metal oxides included when formulating the particles obtained in the Examples and Comparative Examples were carried out as described in 1) to 3) below.

1) Fluorescent X-Ray Analysis of Standard Samples

Tin (IV) oxide powder (from Kanto Chemistry Co., Ltd.; ≥99.0 wt % $SnO_2$), antimony oxide (Sigma-Aldrich; ≥99.9 wt % $Sb_2O_5$), and silica powder (obtained by vacuum drying the product ST-XS from Nissan Chemical Industries, Ltd. at 60° C. for 1 hour, then placing the dried powder in a mortar and crushing with a pestle) were mixed such as to set the weight ratio $SnO_2/Sb_2O_5/SiO_2$ to 1/1/1. The resulting powder was measured using a fluorescent x-ray spectrometer (Supermini 200, from Rigaku Corporation). The peak integrated intensity $A_{Sn1}$ for tin (IV) oxide, the peak integrated intensity $A_{Sb1}$ for antimony (V) oxide and the peak integrated intensity $A_{Si1}$ for silica were computed.

2) Fluorescent X-Ray Analysis of Modified Metal Oxide in Sols Obtained in Examples and Comparative Examples.

The sols of dispersed modified metal oxide obtained in the Examples and Comparative Examples were vacuum dried at 60° C. for 1 hour. The resulting dried powders were placed in a mortar and crushed with a pestle. The crushed particles were measured using a fluorescent x-ray spectrometer (Supermini 200, from Rigaku Corporation).

3) Qualitative and Quantitative Determination of Stannic Oxide and Other Metal Oxides In cases where the fluorescent x-ray peak wavelength measured in 2) was identical with the peak wavelength of the standard sample measured in 1), the metal oxide associated with that peak wavelength was judged to be present. Next, the peak integrated intensity $A_{Sn2}$ for tin (IV) oxide, the peak integrated intensity $A_{Sb2}$ for antimony (V) oxide and the peak integrated intensity $A_{Si2}$ for silica in the fluorescent x-ray pattern measured in 2) were computed. The stannic oxide and other metal oxides present in the modified metal oxides obtained in the Examples and Comparative Examples were quantitatively determined from the following formulas.

$$\text{Stannic oxide content} = (A_{Sn2}/A_{Sn1})/A_{TOTAL}$$

$$\text{Antimony}(V)\text{ oxide content} = A_{Sb2}/A_{Sb1})/A_{TOTAL}$$

$$\text{Silica content} = A_{Si2}/A_{Si1})/A_{TOTAL}$$

$$\text{Here, } A_{TOTAL} = (A_{Sn2}/A_{Sn1}) + (A_{Sb2}/A_{Sb1}) + (A_{Si2}/A_{Si1})$$

Reference Example 1

Preparation of Stannic Oxide-Complex Oxide Colloidal Particles (i) as Cores

Oxalic acid ($(COOH)_2 \cdot 2H_2O$), 37.5 kg, was dissolved in 363 kg of pure water, the solution was warmed to 70° C. under stirring, and 170 kg of 35% hydrogen peroxide solution and 75 kg of metallic tin were added. Addition of the hydrogen peroxide solution and metallic tin were carried out in alternation. First, 10 kg of 35% hydrogen peroxide solution was added, followed by 5 kg of metallic tin. After waiting 5 to 10 minutes for the reaction to reach completion, these operations were repeated. Following addition of the entire amount, another 10 kg of 35% hydrogen peroxide solution was added. The time required for addition was 3 hours. After addition was complete, the system was additionally heated at 95° C. for 1 hour, bringing the reaction to completion.

Next, 231 kg of 35% hydrogen peroxide solution and 52 kg of pure water were added to 629 kg of the resulting sol, diluting the $SnO_2$ to 10 wt % and bringing the $H_2O_2/(COOH)_2$ molar ratio with respect to oxalic acid during charging to 8.0, and 5 hours of aging at 95° C. was carried out. As a result of this operation, the oxalic acid included was decomposed to carbon dioxide gas and water due to reaction with hydrogen peroxide. The resulting stannic oxide slurry was cooled to about 40° C., after which 2.7 kg of isopropylamine (water solubility, 1,000 g/L according to data in *Chemical Book*; reference to this can be made on the website at the following URL: https://www.chemicalbook-.com/ProductList_En.aspx?kwd-isopropylamine) was added and peptization was carried out. The peptized slurry was then passed through a catalyst column packed with about 15 L of a platinum catalyst (N-220, from Süd-Chemie Catalyst KK), circulated, and the decomposition treatment of surplus hydrogen peroxide was carried out. Circulation was carried out for 5 hours at a column flow rate of about 30 L/min, in addition to which the slurry was passed through an anion exchange resin-packed column and subsequently concentrated by membrane ultrafiltration. The resulting sol was a water-dispersed sol of stannic oxide colloidal particles (i), the pH was 11.0, the $SnO_2$ concentration was 10.0 wt %, and the primary particle size as determined by transmission electron microscopy was from 10 to 15 nm.

Reference Example 2

Preparation of Silicon Dioxide-Stannic Oxide Complex Oxide Colloidal Particles (i) as Coating Material JIS No. 3 sodium silicate (29.8 wt % $SiO_2$ basis), 77.2 g, was dissolved in 668.8 g of pure water, following which 20.9 g of sodium stannate $NaSnO_3 \cdot H_2O$ (55.1 wt % $SnO_2$ basis) was dissolved. The resulting aqueous solution was passed through a column packed with a hydrogen form cation exchange resin. Next, 7.2 kg of diisopropylamine (water solubility, 100 g/L according to data in *Chemical Book*, reference to this can be made on the website at the following URL: https://www.chemicalbook.com/ProductList_E-n.aspx?kwd=108-18-9) was added. The resulting sol was a water-dispersed sol of silicon dioxide-stannic oxide complex oxide colloidal particles (ii-2). The pH was 8.0, the total metal oxides concentration ($SiO_2$ and $SnO_2$) was 2.5 wt %, and the primary particle size as determined by transmission electron microscopy was from 1 to 4 nm.

Reference Example 3

Preparation of Antimony Pentoxide Colloidal Particles (iii-1) as Coating Material Antimony trioxide (99.5 wt % $Sb_2O_3$ basis), 12.5 kg, 66.0 kg of pure water and 12.5 kg of potassium hydroxide (95 wt % KOH basis) were added to a 100 L vessel, and 8.4 kg of 35% hydrogen peroxide solution was gradually added under stirring. Next, 17.6 kg of the resulting aqueous solution of potassium antimonate was diluted to 2.2 wt % and passed through a column packed with hydrogen form cation exchange resin. Diisopropylamine, 0.25 kg, was added under stirring to the ion-exchanged antimonic acid solution. The resulting sol was a water-dispersed sol of antimony pentoxide colloidal particles (ii-1), the pH was 10.8, the $Sb_2O_5$ concentration was 1.5 wt % and the primary particle size as determined by transmission electron microscopy was from 1 to 10 nm.

Production Example 1

Preparation of Silicon Dioxide-Stannic Oxide Complex Oxide-Coated Stannic Oxide Colloidal Particles (iii-2-1)

The alkaline aqueous sol of stannic oxide colloidal particles (i) prepared in Reference Example 1 was continuously hydrothermally treated at a treatment temperature of 310° C., a treatment pressure of 20 MPa and an average flow rate of 0.6 L/min. Next, 400 g of the water-dispersed sol of silicon dioxide-stannic oxide complex oxide colloidal particles (ii-2) prepared in Reference Example 2 (10 g in terms of total amount of metal oxides ($SiO_2$ and $SnO_2$), 10 wt % with respect to core particles) was added under stirring to 1,000 g of the resulting alkaline water-dispersed sol of stannic oxide colloidal particles (100 g in terms of $SnO_2$), following which the mixture was aged at 95° C. for 2 hours, giving a water-dispersed sol of silicon dioxide-stannic oxide complex oxide-coated stannic oxide colloidal particles (iii-2-1). The resulting water-dispersed sol was passed through a column packed with hydrogen form cation exchange resin. Next, 3.5 g of tri-n-pentylamine (water solubility, 0.02 g/L according to data presented on Ambeed, Inc. homepage; reference to this can be made on the website at the following URL: https://www.ambeed.com/products/621-77-2.html) was added and concentration carried out by membrane ultrafiltration. The resulting sol was a water-dispersed sol of silicon dioxide-stannic oxide complex oxide-coated stannic oxide colloidal particles (iii-2-1), the pH was 5.5, the total metal oxide ($SnO_2$ and $SiO_2$) concentration was 30.5 wt %, the average particle size according to the dynamic light scattering (DLS) method (dynamic light scattering particle size) was 19 nm, and (total weight of metal oxide other than stannic oxide)/(weight of stannic oxide)=0.065.

Production Example 2

Preparation of Silicon Dioxide-Stannic Oxide Complex Oxide-Coated Stannic Oxide Colloidal Particles (iii-2-2)

Aside from changing the amount of water-dispersed sol of silicon dioxide-stannic oxide complex oxide colloidal particles added in Production Example 1 to 800 g (20 g in terms of total concentration of metal oxides ($SiO_2$ and $SnO_2$); 20 wt % with respect to core particles), a sol was created in the same way as in Production Example 1. The resulting sol was a water-dispersed sol of silicon dioxide-stannic oxide complex oxide-coated stannic oxide colloidal particles (iii-2-2). The pH was 5.5, the total metal oxide ($SnO_2$ and $SiO_2$) concentration was 30.5 wt %, the average particle size according to the dynamic light scattering (DLS) method (dynamic light scattering particle size) was 25 nm, and (total weight of metal oxide other than stannic oxide)/(weight of stannic oxide)=0.125.

Production Example 3

Preparation of Antimony Pentoxide Colloidal Particle-Coated Stannic Oxide Colloidal Particles (iii-1-1)

The alkaline water-dispersed sol of stannic oxide colloidal particles (i) prepared in Reference Example 1 was continuously hydrothermally treated at a treatment temperature of 310° C., a treatment pressure of 20 MPa and an average flow rate of 0.6 L/min. Next, 400 g of the water-dispersed sol of antimony pentoxide colloidal particles (ii-1) prepared in Reference Example 3 (6.0 g in terms of $Sb_2O_5$; 5.0 wt % with respect to core particles) was added under stirring to 1,200 g of the resulting alkaline water-dispersed sol of stannic oxide colloidal particles (120 g in terms of $SnO_2$), following which the mixture was aged at 95° C. for 2 hours, giving a water-dispersed sol of antimony pentoxide colloidal particle-coated stannic oxide colloidal particles (iii-1-1). The resulting water-dispersed sol was passed through a column packed with hydrogen form cation exchange resin. Next, 3.8 g of tri-n-pentylamine was added to the water-dispersed sol thus obtained and concentration was carried out by membrane ultrafiltration. The resulting sol was a water-dispersed sol of antimony pentoxide colloidal particle-coated stannic oxide colloidal particles (iii-1-1), the pH was 4.2, the total metal oxide ($SnO_2$ and $Sb_2O_5$) concentration was 20.5 wt %, the average particle size according to the dynamic light scattering (DLS) method (dynamic light scattering particle size) was 20 nm, and (total weight of metal oxide other than stannic oxide)/(weight of stannic oxide) =0.05.

Production Example 4

Preparation of Silicon Dioxide-Stannic Oxide Complex Oxide-Coated Stannic Oxide Colloidal Particles (iii-2-3)

Aside from changing the hydrothermal treatment temperature in Production Example 1 to 240° C. and the treatment pressure to 7.0 MPa, a sol was created in the same way as in Production Example 1. The resulting sol was a water-dispersed sol of silicon dioxide-stannic oxide complex oxide-coated stannic oxide colloidal particles (iii-2-3). The pH was 5.5, the total metal oxide ($SnO_2$ and $SiO_2$) concentration was 30.5 wt %, the average particle size according to the dynamic light scattering (DLS) method (dynamic light scattering particle size) was 23 nm, and (total weight of metal oxide other than stannic oxide)/(weight of stannic oxide)=0.125.

Production Example 5

Preparation of Silicon Dioxide-Stannic Oxide Complex Oxide-Coated Stannic Oxide Colloidal Particles (iii-2-4)

Aside from changing the hydrothermal treatment temperature in Production Example 1 to 150° C. and the treatment pressure to 1.0 MPa, a sol was created in the same way as in Production Example 1. The resulting sol was a water-dispersed sol of silicon dioxide-stannic oxide complex oxide-coated stannic oxide colloidal particles (iii-2-4). The pH was 5.5, the total metal oxide ($SnO_2$ and $SiO_2$) concentration was 30.5 wt %, the average particle size according to the dynamic light scattering (DLS) method (dynamic light scattering particle size) was 21 nm, and (total weight of metal oxide other than stannic oxide)/(weight of stannic oxide)=0.125.

Production Example 6

Preparation of Silicon Dioxide-Stannic Oxide Complex Oxide-Coated Stannic Oxide Colloidal Particles (iii-2-5)

Aside from not carrying out hydrothermal treatment, a sol was created in the same way as in Production Example 1. The resulting sol was a water-dispersed sol of silicon dioxide-stannic oxide complex oxide-coated stannic oxide colloidal particles (iii-2-5). The pH was 5.5, the total metal oxide ($SnO_2$ and $SiO_2$) concentration was 30.5 wt %, the average particle size according to the dynamic light scattering (DLS) method (dynamic light scattering particle size) was 20 nm, and (total weight of metal oxide other than stannic oxide)/(weight of stannic oxide)=0.125.

Comparative Production Example 1

Preparation of Silicon Dioxide-Stannic Oxide Complex Oxide-Coated Stannic Oxide Colloidal Particles (iii-3)

Aside from not adding tri-n-pentylamine, a sol was created in the same way as in Production Example 1. The resulting sol was a water-dispersed sol of silicon dioxide-stannic oxide complex oxide-coated stannic oxide colloidal particles (iii-3). The pH was 4.2, the total metal oxide ($SnO_2$ and $SiO_2$) concentration was 20.5 wt %, the average particle size according to the dynamic light scattering (DLS) method (dynamic light scattering particle size) was 28 nm, and (total weight of metal oxide other than stannic oxide)/(weight of stannic oxide)=0.125.

Example 1

One hundred grams of the water-dispersed sol of silicon dioxide-stannic oxide complex oxide-coated stannic oxide colloidal particles (iii-2-1) obtained in Production Example 1 was solvent-exchanged to methanol using a rotary evaporator, giving a methanol-dispersed sol of silicon dioxide-stannic oxide complex oxide-coated stannic oxide colloidal particles (iii-2-1). The resulting sol had a pH of 4.7 (diluted with the same weight of water as methanol), a total metal oxide ($SnO_2$ and $SiO_2$) concentration of 20.5 wt %, and an average particle size according to the dynamic light scattering (DLS) method (dynamic light scattering particle size) of 16 nm. The sol stability test result was "○." The level of tri-n-pentylamine remaining in the methanol-dispersed sol of particles (iii-2-1) was 3,900 ppm, the level of diisopropylamine was 180 ppm and the level of isopropylamine was 24 ppm. The degree of crystallization of the core particles (i) was 92%, the refractive index of the particles (iii-2-1) was 1.91, and an applied film containing the particles (iii-2-1) had a resistivity of $1.1\times10^{11}\Omega/\square$. The weight ratio amine (b)/amine (a) was 19.1.

Example 2

One hundred grams of the water-dispersed sol of silicon dioxide-stannic oxide complex oxide-coated stannic oxide colloidal particles (iii-2-2) obtained in Production Example 2 was solvent-exchanged to methanol using a rotary evaporator, giving a methanol-dispersed sol of silicon dioxide-stannic oxide complex oxide-coated stannic oxide colloidal particles (iii-2-2). The resulting sol had a pH of 4.8 (diluted with the same weight of water as methanol), a total metal oxide ($SnO_2$ and $SiO_2$) concentration of 20.5 wt %, and an average particle size according to the dynamic light scattering (DLS) method (dynamic light scattering particle size) of 21 nm. The sol stability test result was "○." The level of tri-n-pentylamine remaining in the methanol-dispersed sol of particles (iii-2-2) was 4,200 ppm, the level of diisopropylamine was 190 ppm and the level of isopropylamine was 22 ppm. The degree of crystallization of the core particles (i) was 91%, the refractive index of the particles (iii-2-2) was 1.87, and an applied film containing the particles (iii-2-2) had a resistivity of $1.9\times10^{11}\Omega/\square$. The weight ratio amine (b)/amine (a) was 19.8.

Example 3

One hundred grams of the water-dispersed sol of silicon dioxide-stannic oxide complex oxide-coated stannic oxide colloidal particles (iii-1-1) obtained in Production Example 3 was solvent-exchanged to methanol using a rotary evaporator, giving a methanol-dispersed sol of silicon dioxide-stannic oxide complex oxide-coated stannic oxide colloidal particles (iii-1-1). The resulting sol had a pH of 5.2 (diluted with the same weight of water as methanol), a total metal oxide ($SnO_2$ and $SiO_2$) concentration of 30.5 wt %, and an average particle size according to the dynamic light scattering (DLS) method (dynamic light scattering particle size) of 16 nm. The sol stability test result was "○." The level of tri-n-pentylamine remaining in the methanol-dispersed sol of particles (iii-1-1) was 1,500 ppm and the level of diisopropylamine was 40 ppm. The degree of crystallization of the core particles (i) was 92%, the refractive index of the particles (iii-1-1) was 1.93, and an applied film containing the particles (iii-1-1) had a resistivity of $6.1\times10^{10}\Omega/\square$. The weight ratio amine (b)/amine (a) was 37.5.

Example 4

One hundred grams of the water-dispersed sol of silicon dioxide-stannic oxide complex oxide-coated stannic oxide colloidal particles (iii-2-3) obtained in Production Example 4 was solvent-exchanged to methanol using a rotary evaporator, giving a methanol-dispersed sol of silicon dioxide-stannic oxide complex oxide-coated stannic oxide colloidal particles (iii-2-3). The resulting sol had a pH of 5.1 (diluted with the same weight of water as methanol), a total metal oxide ($SnO_2$ and $SiO_2$) concentration of 30.5 wt %, and an average particle size according to the dynamic light scattering (DLS) method (dynamic light scattering particle size) of 19 nm. The sol stability test result was "○." The level of tri-n-pentylamine remaining in the methanol-dispersed sol of particles (iii-2-3) was 3,900 ppm, the level of diisopropylamine was 180 ppm and the level of isopropylamine was 41 ppm. The degree of crystallization of the core particles (i) was 85%, the refractive index of the particles (iii-2-3) was 1.85, and an applied film containing the particles (iii-2-3) had a resistivity of $4.3\times10^{11}\Omega/\square$. The weight ratio amine (b)/amine (a) was 17.6.

Example 5

One hundred grams of the water-dispersed sol of silicon dioxide-stannic oxide complex oxide-coated stannic oxide colloidal particles (iii-2-4) obtained in Production Example 5 was solvent-exchanged to methanol using a rotary evaporator, giving a methanol-dispersed sol of silicon dioxide-stannic oxide complex oxide-coated stannic oxide colloidal particles (iii-2-4). The resulting sol had a pH of 5.2 (diluted with the same weight of water as methanol), a total metal oxide ($SnO_2$ and $SiO_2$) concentration of 30.5 wt %, and an average particle size according to the dynamic light scattering (DLS) method (dynamic light scattering particle size) of 19 nm. The sol stability test result was "○." The level of tri-n-pentylamine remaining in the methanol-dispersed sol of particles (iii-2-4) was 4,000 ppm, the level of diisopropylamine was 160 ppm and the level of isopropylamine was 93 ppm. The degree of crystallization of the core particles (i) was 77%, the refractive index of the particles (iii-2-4) was 1.83, and an applied film containing the particles (iii-2-4) had a resistivity of $8.3\times10^{11}\Omega/\square$. The weight ratio amine (b)/amine (a) was 15.8.

Example 6

One hundred grams of the water-dispersed sol of silicon dioxide-stannic oxide complex oxide-coated stannic oxide colloidal particles (iii-2-5) obtained in Production Example 6 was solvent-exchanged to methanol using a rotary evaporator, giving a methanol-dispersed sol of silicon dioxide-stannic oxide complex oxide-coated stannic oxide colloidal particles (iii-2-5). The resulting sol had a pH of 4.7 (diluted with the same weight of water as methanol), a total metal oxide ($SnO_2$ and $SiO_2$) concentration of 30.5 wt %, and an average particle size according to the dynamic light scattering (DLS) method (dynamic light scattering particle size) of 21 nm. The sol stability test result was "○." The level of tri-n-pentylamine remaining in the methanol-dispersed sol of particles (iii-2-5) was 3,500 ppm, the level of diisopropylamine was 140 ppm and the level of isopropylamine was 160 ppm. The degree of crystallization of the core particles (i) was 68%, the refractive index of the particles (iii-2-5) was 1.81, and an applied film containing the particles (iii-2-5) had a resistivity of $1.2\times10^{12}\Omega/\square$. The weight ratio amine (b)/amine (a) was 11.7.

Example 7

One hundred grams of the water-dispersed sol of silicon dioxide-stannic oxide complex oxide-coated stannic oxide colloidal particles (iii-2-2) obtained in Production Example 2 was solvent-exchanged to ethanol using a rotary evaporator, giving an ethanol-dispersed sol of silicon dioxide-stannic oxide complex oxide-coated stannic oxide colloidal particles (iii-2-2). The resulting sol had a pH of 5.0 (diluted with the same weight of water as ethanol), a total metal oxide ($SnO_2$ and $SiO_2$) concentration of 20.5 wt %, and an average particle size according to the dynamic light scattering (DLS) method (dynamic light scattering particle size) of 22 nm. The sol stability test result was "○." The level of tri-n-pentylamine remaining in the ethanol-dispersed sol of particles (iii-2-2) was 4,400 ppm, the level of diisopropylamine was 180 ppm and the level of isopropylamine was 19 ppm. The degree of crystallization of the core particles (i) was 91%, the refractive index of the particles (iii-2-2) was 1.87, and an applied film containing the particles (iii-2-2) had a resistivity of $2.6\times10^{11}\Omega/\square$. The weight ratio amine (b)/amine (a) was 22.1.

Example 8

One hundred grams of the water-dispersed sol of silicon dioxide-stannic oxide complex oxide-coated stannic oxide colloidal particles (iii-2-2) obtained in Production Example 2 was solvent-exchanged to 2-propanol using a rotary evaporator, giving a 2-propanol-dispersed sol of silicon dioxide-stannic oxide complex oxide-coated stannic oxide colloidal particles (iii-2-2). The resulting sol had a pH of 5.2 (diluted with the same weight of water as 2-propanol), a total metal oxide ($SnO_2$ and $SiO_2$) concentration of 15.0 wt %, and an average particle size according to the dynamic light scattering (DLS) method (dynamic light scattering particle size) of 22 nm. The sol stability test result was "○." The level of tri-n-pentylamine remaining in the 2-propanol-dispersed sol of particles (iii-2-2) was 4,800 ppm, the level of diisopropylamine was 170 ppm and the level of isopropylamine was 19 ppm. The degree of crystallization of the core particles (i) was 92%, the refractive index of the particles (iii-2-2) was 1.87, and an applied film containing the particles (iii-2-2) had a resistivity of $2.3\times10^{11}\Omega/\square$. The weight ratio amine (b)/amine (a) was 25.4.

EXAMPLE 9

An amount of 14.6 g of the water-dispersed sol of antimony pentoxide colloidal particle-coated stannic oxide colloidal particles (iii-1-1) obtained in Production Example 3 was solvent-exchanged to ethanol using a rotary evaporator, giving 20.0 g of an ethanol-dispersed sol of antimony pentoxide colloidal particle-coated stannic oxide colloidal particles (iii-1-1) having a total metal oxide ($SnO_2$ and $Sb_2O_5$) concentration of 15.0 wt %. Next, 1.00 g of polyoxyethylene alkyl ether phosphate (RS-710, from Toho Chemical Industry Co., Ltd.) diluted with ethanol to a weight ratio of 30% was added under stirring as a surface modifier to the resulting sol and the particles were surface modified by 5 hours of refluxing under applied heat at 90° C. Propylene glycol monomethyl ether, 12.0 g, was added to the resulting surface-modified ethanol-dispersed sol and the ethanol was evaporated using a rotary evaporator, giving 15.0 g of a propylene glycol monomethyl ether-dispersed sol of antimony pentoxide particle-coated stannic oxide colloidal particles (iii-1-1). The resulting sol had a pH of 4.7 (diluted with the same weight of water as ethanol), a total metal oxide ($SnO_2$ and $Sb_2O_5$) concentration of 20.0 wt %, and an average particle size according to the dynamic light scattering (DLS) method (dynamic light scattering particle size) of 25 nm. The sol stability test result was "○." The level of tri-n-pentylamine remaining in the propylene glycol monomethyl ether-dispersed sol of particles (iii-1-1) was 4,900 ppm, the level of diisopropylamine was 240 ppm and the level of isopropylamine was 25 ppm. The degree of crystallization of the core particles (i) was 92%, the refractive index of the particles (iii-1-1) was 1.91, and an applied film containing the particles (iii-1-1) had a resistivity of $8.0\times10^{11}\Omega/\square$. The weight ratio amine (b)/amine (a) was 18.5.

Comparative Example 1

One hundred grams of the water-dispersed sol of silicon dioxide-stannic oxide complex oxide-coated stannic oxide colloidal particles (iii-3) obtained in Comparative Production Example 1 was solvent-exchanged to methanol using a rotary evaporator, whereupon the sol thickened and gelled during solvent exchange.

Comparative Example 2

Aside from not adding isopropylamine during the preparation of stannic oxide complex oxide colloidal particles (i) serving as cores, a sol was produced in the same way as in Reference Example 1. The stannic oxide slurry did not peptize, and so a water-dispersed sol could not be obtained.

INDUSTRIAL APPLICABILITY

The modified metal oxide particles of the invention have a high electrical conductivity and a high refractive index. By being stably dispersed in an organic solvent, they are able to provide the above-described sols which, when applied as a coating agent to a substrate, have transparency, a high particle refractive index and good film resistivity.

The invention claimed is:

1. A modified metal oxide sol comprising modified metal oxide particles dispersed in an organic solvent, the modified metal oxide particles (iii) comprising, as cores, stannic oxide particles (i) which have an average primary particle size of from 4 to 50 nm and are coated with metal oxide particles (ii) that have an average primary particle size of from 1 to 10 nm and are composed of at least one metal oxide selected from the group consisting of antimony oxide, stannic oxide and silicon oxide, wherein the average primary particle size of the core particles (i) and the average primary particle size of the coating particles (ii) satisfy the relationship:

size of core particles(i)≥size of coating particles(ii), the ratio (total weight of metal oxides other than stannic oxide)/(weight of stannic oxide) is from 0.005 to 1.0, the sol includes an amine (a) having a water solubility of 0.1 g/L or more and an amine (b) having a water solubility of less than 0.1 g/L, the amine (a) is a primary amine, a secondary amine or a combination thereof, the amine (b) is a tertiary amine, and a weight ratio of the amine (b)/the amine (a) is 3.0 to 200.

2. The modified metal oxide sol of claim 1, wherein the average particle size according to dynamic light scattering is from 5 to 100 nm.

3. The modified metal oxide sol of claim 1, wherein the stannic oxide particles (i) serving as core particles are hydrothermally treated stannic oxide particles.

4. The modified metal oxide sol of claim 1, wherein the stannic oxide particles (i) serving as core particles have a degree of crystallization according to x-ray diffractometry which is at least 60%.

5. The modified metal oxide sol of claim 1, wherein the metal oxide particles (ii) serving as coating particles are antimony oxide particles or composite particles of stannic oxide and silicon oxide in a weight ratio of between 1:0.1 and 1:10.0.

6. The modified metal oxide sol of claim 1, wherein the amine (a) is included within the modified metal oxide sol in an amount of from 20 to 3,000 ppm.

7. The modified metal oxide sol of claim 1, wherein the amine (b) is included within the modified metal oxide sol in an amount of from 1,000 to 30,000 ppm.

8. The modified metal oxide sol of claim 1, wherein the amine (a) is at least one amine selected from the group consisting of n-propylamine, di-n-propylamine, isopropylamine, diisopropylamine, n-butylamine, isobutylamine, di-n-butylamine and diisobutylamine.

9. The modified metal oxide sol of claim 1, wherein the amine (b) is at least one amine selected from the group consisting of tri-n-butylamine, triisobutylamine, tri-n-pentylamine and triisopentylamine.

10. The modified metal oxide sol of claim 1, wherein the weight ratio amine (b)/amine (a) is from 3.0 to 200.

11. The modified metal oxide sol of claim 1, wherein the modified metal oxide particles (iii) are coated with at least one coating agent selected from the group consisting of compounds of formulas (1) to (6) below $$R^1_aSi(R^2)_{4-a} \quad (1)$$

$$[R^3_bSi(R^4)_{3-b}]_2Y_c \quad (2)$$

$$R^5_dSi(R^6)_{4-d} \quad (3)$$

-continued (4)

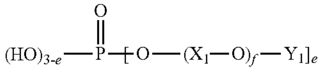

(5)

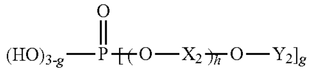

(6)

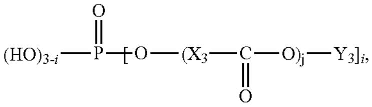

where in formula (1), each $R^1$ is an alkyl group, a halogenated alkyl group, an alkenyl group, an aryl group or an organic group having a polyether, epoxy, (meth)acryloyl, mercapto, amino, ureido or cyano group and is bonded to a silicon atom via a Si—C bond, each $R^2$ is an alkoxy group, an acyloxy group or a halogen group, and the letter 'a' is an integer from 1 to 3;

in formulas (2) and (3), $R^3$ and $R^5$ are each independently an alkyl group of 1 to 3 carbon atoms or an aryl group of 6 to 30 carbon atoms and are each bonded to a silicon atom via a Si—C bond, $R^4$ and $R^6$ are each independently an alkoxy group, an acyloxy group or a halogen group, Y is an alkylene group, an NH group or an oxygen atom, b is an integer from 1 to 3, c is the integer 0 or 1, and d is an integer from 1 to 3; and in formulas (4) to (6), $X_1$, $X_2$ and $X_3$ are each independently an alkylene group of 2 to 20 carbon atoms, f, h and j are each integers from 1 to 100, e, g and i are each integers from 1 to 3, and $Y_1$, $Y_2$ and $Y_3$ are each independently a hydrogen atom, an alkyl group of 1 to 20 carbon atoms, an alkenyl group of 2 to 20 carbon atoms, an aryl group of 6 to 30 carbon atoms or a (meth)acryl group.

12. The modified metal oxide sol of claim 1, wherein the organic solvent is an alcohol, a ketone, an ester, an ether, an amide, a hydrocarbon, a cyano group-containing solvent, a halogen-containing solvent, a sulfonyl group-containing solvent, a carboxyl group-containing solvent, or a mixed solvent thereof.

13. The modified metal oxide sol of claim 12, wherein the alcohol is a monohydric alcohol of 1 to 20 carbon atoms or a polyhydric alcohol of 1 to 20 carbon atoms.

14. An antistatic composition comprising the modified metal oxide particles (iii) within the modified metal oxide sol of claim 1.

15. A composition for an electron transport material, comprising the modified metal oxide particles (iii) within the modified metal oxide sol of claim 1.

16. A method of producing the organic solvent sol of modified metal oxide particles according to claim 1, comprising the steps of:

(A) preparing an aqueous sol of stannic oxide particles (i) having an average primary particle size of from 4 to 50 nm, which sol includes an amine (a) having a water solubility of 0.1 g/L or more;

(B) preparing an aqueous sol of metal oxide particles (ii) of at least one metal oxide selected from the group consisting of antimony oxide, stannic oxide and silicon oxide and having an average primary particle size of from 1 to 10 nm, which sol includes an amine (a) having a water solubility of 0.1 g/L or more;

(C) mixing the aqueous sol of stannic oxide particles (i) obtained in Step (A) with the aqueous sol of metal oxide particles (ii) obtained in Step (B) in a weight ratio, expressed as (total weight of metal oxides other than stannic oxide)/(weight of stannic oxide), of from 0.005 to 1.0 to produce modified metal oxide particles (iii) that have, as cores, stannic oxide particles (i) of an average primary particle size of from 4 to 50 nm and are coated with metal oxide particles (ii) composed of at least one metal oxide selected from the group consisting of antimony oxide, stannic oxide and silicon oxide and having an average primary particle size of from 1 to 10 nm, and adding an amine (b) having a water solubility of less than 0.1 g/L; and (D) solvent exchanging the aqueous medium of the aqueous sol of the modified metal oxide particles (iii) obtained in Step (C) to an alcohol having from 1 to 5 carbon atoms.

17. The method for preparing an organic solvent sol of modified metal oxide particles (iii) according to claim 16, wherein Step (A) is the step (A-1) of adding an amine (a) having a water solubility of 0.1 g/L or more to the aqueous sol of stannic oxide particles (i) having an average primary particle size of from 4 to 50 nm and then hydrothermally treating the sol for a period of from 0.1 to 100 hours at a pressure of between 0.1 and 40 MPa and a temperature of between 100° C. and 350° C.

18. The method for preparing an organic solvent sol of modified metal oxide particles (iii) according to claim 16, further comprising, after Step (D), the steps of:

(E) adding at least one coating agent selected from the group consisting of compounds of formulas (1) to (6) below to the organic solvent sol of modified metal oxide particles (iii) and surface-treating the modified metal oxide particles (iii); and/or (F) solvent exchanging the alcohol having from 1 to 5 carbon atoms in the alcohol solvent sol of modified metal oxide particles (iii) to an alcohol other than that used in Step (D), a ketone, an ester, an ether, an amide, a hydrocarbon, a cyano group-containing solvent, a halogen-containing solvent, a sulfonyl group-containing solvent, a carboxyl group-containing solvent, or a mixed solvent thereof, $$R^1_aSi(R^2)_{4-a} \quad (1)$$

$$[R^3_bSi(R^4)_{3-b}]_2Y_c \quad (2)$$

$$R^5_dSi(R^6)_{4-d} \quad (3)$$

(4)

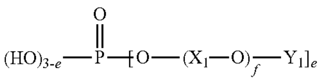

-continued (5)

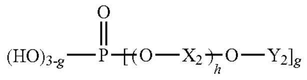

(6)

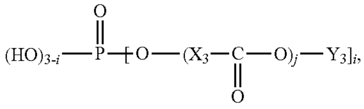

where in formula (1), each $R^1$ is an alkyl group, a halogenated alkyl group, an alkenyl group, an aryl group or an organic group having a polyether, epoxy, (meth)acryloyl, mercapto, amino, ureido or cyano group and is bonded to a silicon atom via a Si—C bond, each $R^2$ is an alkoxy group, an acyloxy group or a halogen group, and the letter 'a' is an integer from 1 to 3;

in formulas (2) and (3), $R^3$ and $R^5$ are each independently an alkyl group of 1 to 3 carbon atoms or an aryl group of 6 to 30 carbon atoms and are each bonded to a silicon atom via a Si—C bond, $R^4$ and $R^6$ are each independently an alkoxy group, an acyloxy group or a halogen group, Y is an alkylene group, an NH group or an oxygen atom, b is an integer from 1 to 3, c is the integer 0 or 1, and d is an integer from 1 to 3; and in formulas (4) to (6), $X_1$, $X_2$ and $X_3$ are each independently an alkylene group of 2 to 20 carbon atoms, f, h and j are each integers from 1 to 100, e, g and i are each integers from 1 to 3, and $Y_1$, $Y_2$ and $Y_3$ are each independently a hydrogen atom, an alkyl group of 1 to 20 carbon atoms, an alkenyl group of 2 to 20 carbon atoms, an aryl group of 6 to 30 carbon atoms or a (meth)acryl group.

19. The modified metal oxide sol of claim 1, wherein the amine (a) is included within the modified metal oxide sol in an amount of from 20 to 3,000 ppm, the amine (b) is included within the modified metal oxide sol in an amount of from 1,000 to 30,000 ppm, the amine (a) is at least one amine selected from the group consisting of n-propylamine, di-n-propylamine, isopropylamine, diisopropylamine, n-butylamine, isobutylamine, di-n-butylamine and diisobutylamine, and the amine (b) is at least one amine selected from the group consisting of tri-n-butylamine, triisobutylamine, tri-n-pentylamine and triisopentylamine.

20. The modified metal oxide sol of claim 1, wherein the weight ratio of the amine (b)/the amine (a) is 3.0 to 100.

21. The modified metal oxide sol of claim 1, wherein the weight ratio of the amine (b)/the amine (a) is 3.0 to 60.

* * * * *